US009489631B2

(12) United States Patent
Khan et al.

(10) Patent No.: US 9,489,631 B2
(45) Date of Patent: Nov. 8, 2016

(54) COGNITIVE MAP-BASED DECISION SIMULATION FOR TRAINING (CMDST)

(71) Applicant: Columbus State University Research Service Foundation, Inc., Columbus, GA (US)

(72) Inventors: Mohammed Shamimur Rahman Khan, Columbus, GA (US); Osama George Khouri, Columbus, GA (US); Wayne Charles Summers, Midland, GA (US); Rodrigo Obando, Columbus, GA (US); Vladimir Zanev, Columbus, GA (US); Sebastian Wankun Khor, Bonython (AU); Robert Smith, LaGrange, GA (US)

(73) Assignee: Columbus State University Research Service Foundation, Inc., Columbus, GA (US)

( * ) Notice: Subject to any disclaimer, the term of this patent is extended or adjusted under 35 U.S.C. 154(b) by 403 days.

(21) Appl. No.: 13/932,422

(22) Filed: Jul. 1, 2013

(65) Prior Publication Data

US 2014/0006336 A1    Jan. 2, 2014

Related U.S. Application Data

(60) Provisional application No. 61/666,358, filed on Jun. 29, 2012.

(51) Int. Cl.
*G06N 5/02* (2006.01)
*G09B 9/00* (2006.01)
*G06N 5/04* (2006.01)
*G06F 3/01* (2006.01)

(52) U.S. Cl.
CPC ............... *G06N 5/048* (2013.01); *G06F 3/011* (2013.01); *G06N 5/02* (2013.01); *G09B 9/00* (2013.01)

(58) Field of Classification Search
None
See application file for complete search history.

(56) References Cited

U.S. PATENT DOCUMENTS

| | | | |
|---|---|---|---|
| 6,064,998 | A | 5/2000 | Zabloudil et al. |
| 6,092,058 | A | 7/2000 | Smyth |
| 6,761,697 | B2 | 7/2004 | Rubinstenn et al. |
| 6,807,535 | B2 | 10/2004 | Goodkovsky |
| 7,024,399 | B2 | 4/2006 | Sumner, II et al. |
| 7,062,508 | B2 | 6/2006 | Andreev et al. |

(Continued)

OTHER PUBLICATIONS

Khan et al., Group Decision Support Using Fuzzy Cognitive Maps for Causal Reasoning, Group Decision and Negotiation 13: 463-480 [online], 2004 [retrieved on Apr. 19, 2015]. Retrieved from the Internet:<URL: http://link.springer.com/content/pdf/10.1023%2FB%3AGRUP.0000045748.89201.f3.pdf>.*

*Primary Examiner* — Nathan Brown, Jr.

(74) *Attorney, Agent, or Firm* — Meunier Carlin & Curfman LLC

(57) ABSTRACT

Disclosed is a Cognitive Map-Based Tactical Decision Simulation for Training (CMDST) uses fuzzy cognitive maps (FCM's) to: 1) model high-stress tactical problems or engagements and their causal relationships; 2) simulate situational activities immediately prior to, during, and following the occurrence of a tactical problem or engagement; 3) calculate the relative values of different courses of action; 4) perform individual performance and comparative analysis of selected courses of action; 5) conduct after action reviews to solidify lessons learned from the simulation; and 6) develop individual decision making action plans to outline specific actions to be undertaken to improve future decision making performance.

14 Claims, 16 Drawing Sheets

(56) References Cited

U.S. PATENT DOCUMENTS

| | | |
|---|---|---|
| 7,692,685 B2 | 4/2010 | Beal et al. |
| 8,021,160 B2 | 9/2011 | Chang |
| 8,112,369 B2 | 2/2012 | Abramson |
| 2002/0107681 A1 | 8/2002 | Goodkovsky |
| 2006/0024654 A1 | 2/2006 | Goodkovsky |
| 2006/0106657 A1 | 5/2006 | Pollak et al. |
| 2011/0066998 A1 | 3/2011 | Scandura |

* cited by examiner

Schematic: Cognitive Map-based Decision Simulation for Training

Schematic: Cognitive Map-based Decision Simulation for Training

Schematic: Cognitive Map-based Decision Simulation for Training

Schematic: FCM Engine

Schematic: FCM VR Engine – Windows Service

Schematic: Unity 3D Simulator within CMTrainer – Design Diagram

Schematic: Flash Simulation Structure within CMTrainer

Schematic: Flash Simulation Structure within CMTrainer

Schematic: FCM Generator Components

Platforms Compatible with the CMDST System

Tactical Fuzzy Cognitive Map (FCM)
FCM for Dismounted Immediate Action Drill to Assault through Far Ambush Tactical Fuzzy Cognitive Map (FCM)
FCM for Mounted Immediate Action Drill to Assault through Far Ambush Nodes, Edges and Values Performance Analysis 1

Performance Analysis 2

Performance Analysis 3

COGNITIVE MAP-BASED DECISION SIMULATION FOR TRAINING (CMDST)

CROSS-REFERENCE TO RELATED APPLICATION

This application claims priority to U.S. Provisional Patent No. 61/666,358, filed Jun. 29, 2012, entitled "Cognitive Map-Based Decision Simulation for Training (CMDST)," which is incorporated herein by reference in its entirety.

GOVERNMENT FUNDING

The subject matter described herein was made with U.S. Government support under U.S. Army RDECOM Control Center contract number W91CRB-10-C-0188. The United States Government has certain rights in the invention.

BACKGROUND OF THE DISCLOSURE

Cognitive maps have been available and used for more than 60-years. However, until the 1970's their use was relegated almost exclusively to strategic decision making. One of the more studied and well-known uses of cognitive maps occurred following WWII and involved the British. They used cognitive maps to aid in understanding the relationships between and ramifications of establishing specific geographic boundaries between the emerging nations, tribal, ethnic and religious areas in the Middle East.

Twenty years after the British use of rather simplistic cognitive maps to aid in making strategic decisions the cognitive map took on a more complex nature. First described by Axelrod in 1976, cognitive maps were used to represent concepts or events pertaining to a scenario of interest, as well as the complex causal relationships in it. The cognitive map-based model provided a mechanism for static analysis of a scenario. When used in conjunction with causal inferencing, cognitive maps can be employed to cope with complex problems that do not lend themselves to conventional analytical solutions because of abstract interrelationships among variables. An enhanced version of the cognitive map, known as the fuzzy cognitive map (FCM) and introduced by Bart Kosko in 1986, is also capable of modeling feedback and simulating the evolution of a given scenario with time. Such cognitive maps have been shown to have potential for static as well as dynamic analysis of scenarios and thus provide the framework for a new class of decision support tools.

Development of tactical decision making competency is an integral part of a military commander's training. There are few classrooms yielding better lessons regarding effective military operations than the battlefield; however, modeling and simulation provides warfighters an opportunity to develop their tactical decision making skills without the risk of casualties or the expense of wartime resources. In fact, history has demonstrated that tactical leaders who have the most accurate understanding of their situation coupled with the ability to rapidly process information intuitively make the best decisions and, therefore, are the most likely to emerge successful in their engagements with the enemy.

The distinguishing factor that allows tactical leaders to make quick, high quality decisions is experience. From the time that man first banned together under the leadership of another, tactical leadership experience and decision making competency were developed through actual combat. However, it didn't take man long to discover that practicing and rehearsing for battle with their armies, their weapons, and their subordinate leaders dramatically increased their ability to fight effectively and win once on the battlefield. Thus, experiences gained through training provided a second type of experience that enhanced their army's ability to fight and the leader's ability to make good and timely decisions. This formula for training armies has remained fundamentally unchanged for more than 5,000 years.

A leader's proficiency in combat as well as their decision making competency, therefore, remains the byproduct of their combat and training experiences and their ability to learn from those experiences. If over the past 5,000 years the formula for gaining tactical experience has not changed, one cannot say the same for the nature of warfare. The changes to the nature of war are myriad. In the very first tactical engagements, the fastest thing on the battlefield was a running man. Then the horse was added and the cavalry was born. For most of the 5,000 years of tactical engagements, the horse has been the fastest troop carrier on the battlefield. Now, main battle tanks weighing almost 80-tons can travel at speeds approaching 60 miles per hour. Now a single B1 bomber can carry a bomb payload around the world and drop its payload of atomic weapons on an enemy's cities with an explosive power that exceeds the tonnage equivalent of all explosive weapons used in all warfare up to the Twentieth Century.

Today most modern nations can communicate via satellite to virtually any location or person in the world. And the information available to even the smallest maneuver unit, the infantry squad, was inconceivable even 40-years ago. One of most daunting problems facing tactical commanders today is the abundance of data available to them. The speed, lethality, and complexity that characterize modern warfare today are unequalled in the history of man. The age of warfare in which combatants literally could see the whites of the eyes of their adversary during an engagement, while not completely relegated to the way of the dinosaur, is a rare phenomenon today. In modern warfare, the so-called combatant can sit in the comfort of an office building thousands of miles away from their adversary, detect the adversary by using an unmanned platform called a drone to find, then mark the target with a laser designator, and destroy the adversary using a missile dropped from the same drone using the laser to guide it. Modern technology has allowed warfighters to distance themselves from their adversary by thousands of miles, develop weapons that can penetrate 200-feet of reinforced concrete, fly airplanes that can travel at speeds three time the speed of sound, and literally obliterate a nation in a matter of seconds.

BRIEF SUMMARY OF THE DISCLOSURE

Disclosed herein is a Cognitive Map-Based Decision Simulation for Training (CMDST), which is a software simulation system that provides an effective approach to improving a novice practitioner's decision making competency. The CMDST is a total learning system. Simulations are provided to improve an individual's decision quality and timeliness in three ways: (1) by increasing the novice's level of experience in resolving increasingly difficult and complex domain situations; (2) by developing an in depth understanding of the critical decision factors within the novice's operating domain: and (3) by thoroughly dissecting and analyzing each decision and its outcomes made by the novice, then comparing these decision results against the decision results of a domain expert.

In accordance with an aspect of the disclosure, there is provided a method for developing decision making competency using CMDST and domain-specific fuzzy cognitive maps (FCMs). The CMDST may include simulating the resolution of domain-related problems and emergency situations, the simulating using critical decision factors and their relationships; performing comparative analyses and calculate comparative values for different decisions selected to resolve the same domain-related problem; and visually aiding in the conduct of performance analyses and after action reviews (AAR) following the simulation of various courses of action and their related domain-specific decisions to the same domain-related problem.

Other features and further advantages of the disclosure will be apparent from the following description and the non-limiting example, as well as from the attached claims.

BRIEF DESCRIPTION OF THE SEVERAL VIEWS OF THE DISCLOSURE

The present disclosure will now be described in more detail and with reference to the example and to the drawings, of which:

FIGS. 1(a), 1(b) and 1(c) illustrate a schematic of the CMDST system;

Figure 1A:
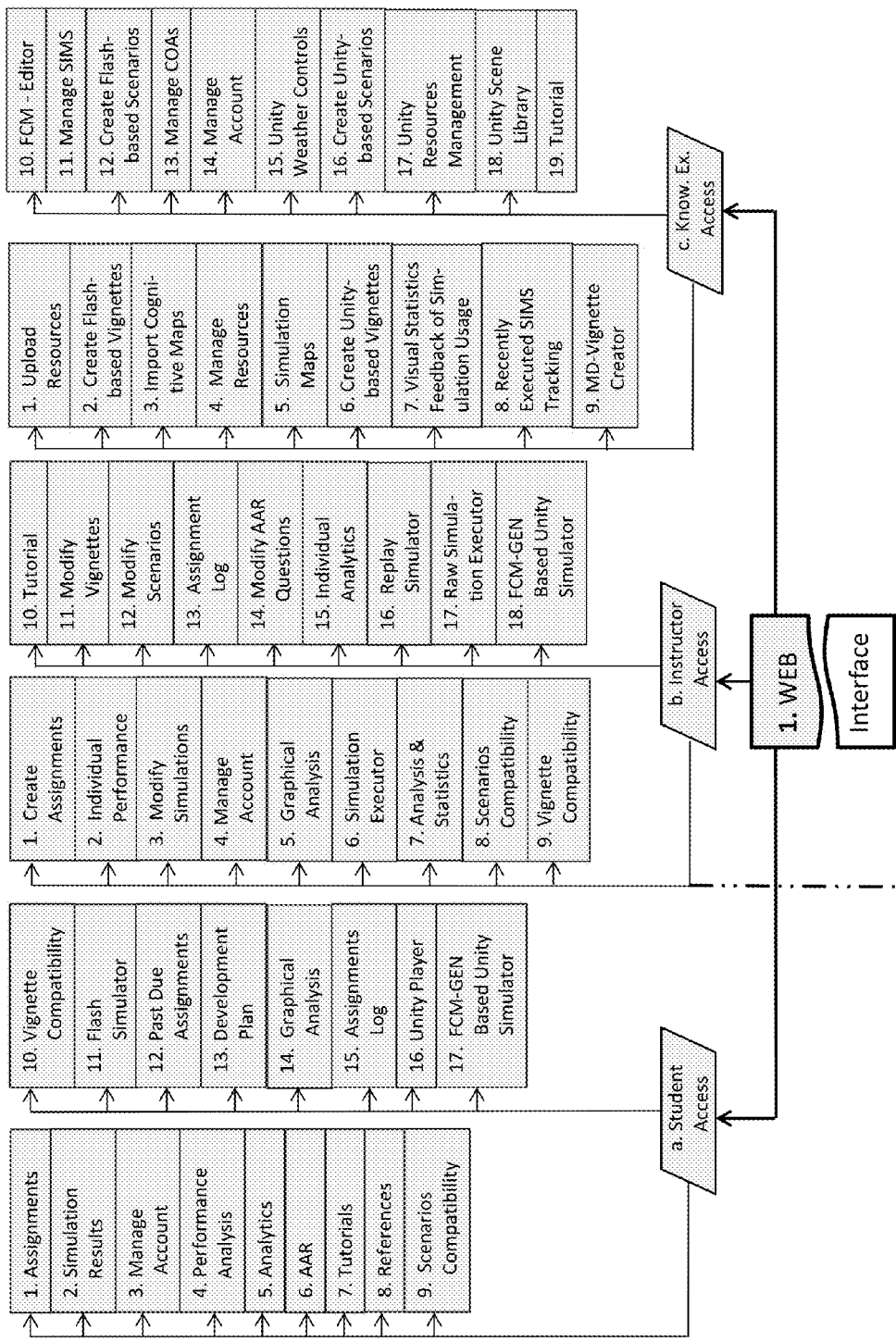
Figure 1B:
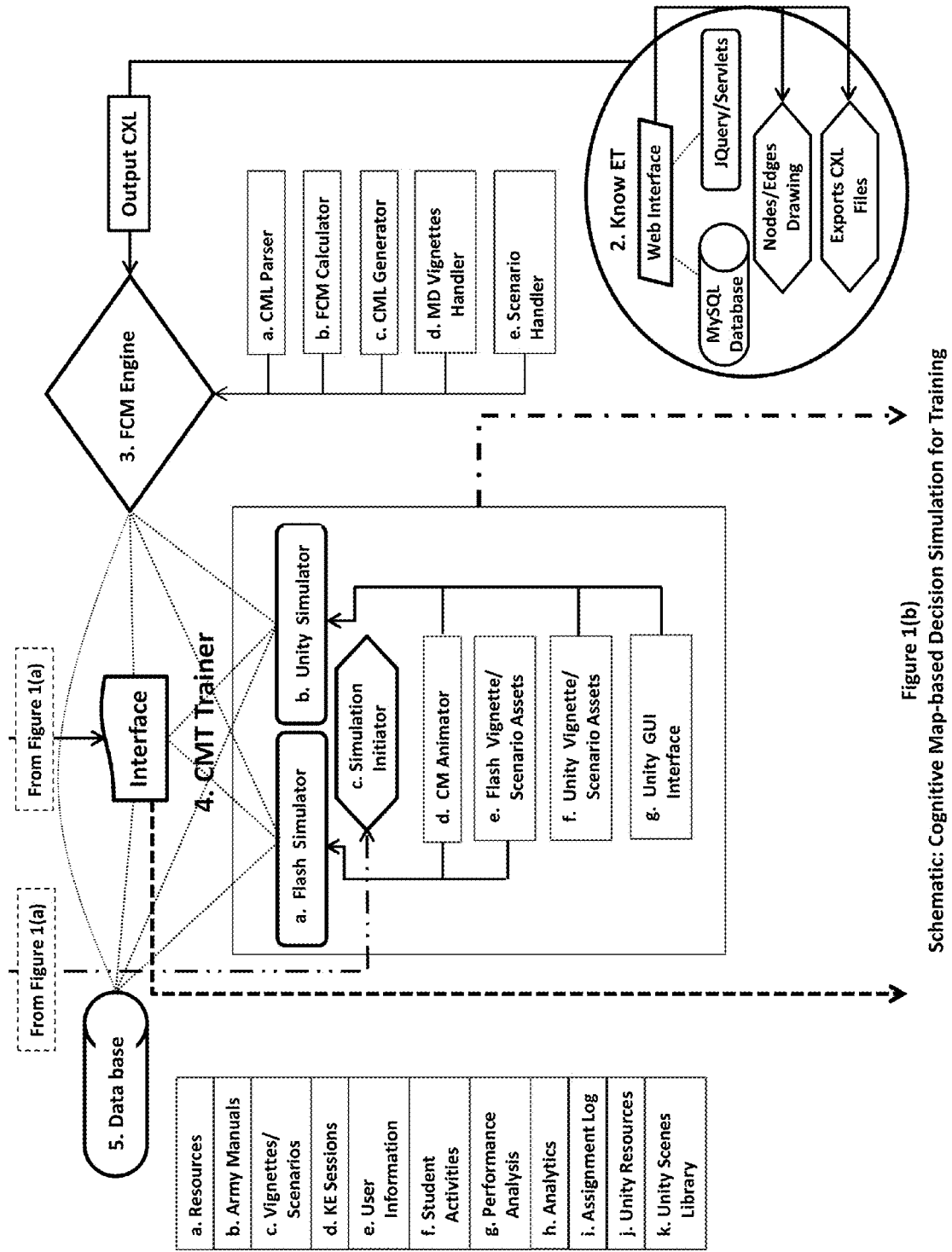
Figure 1C:
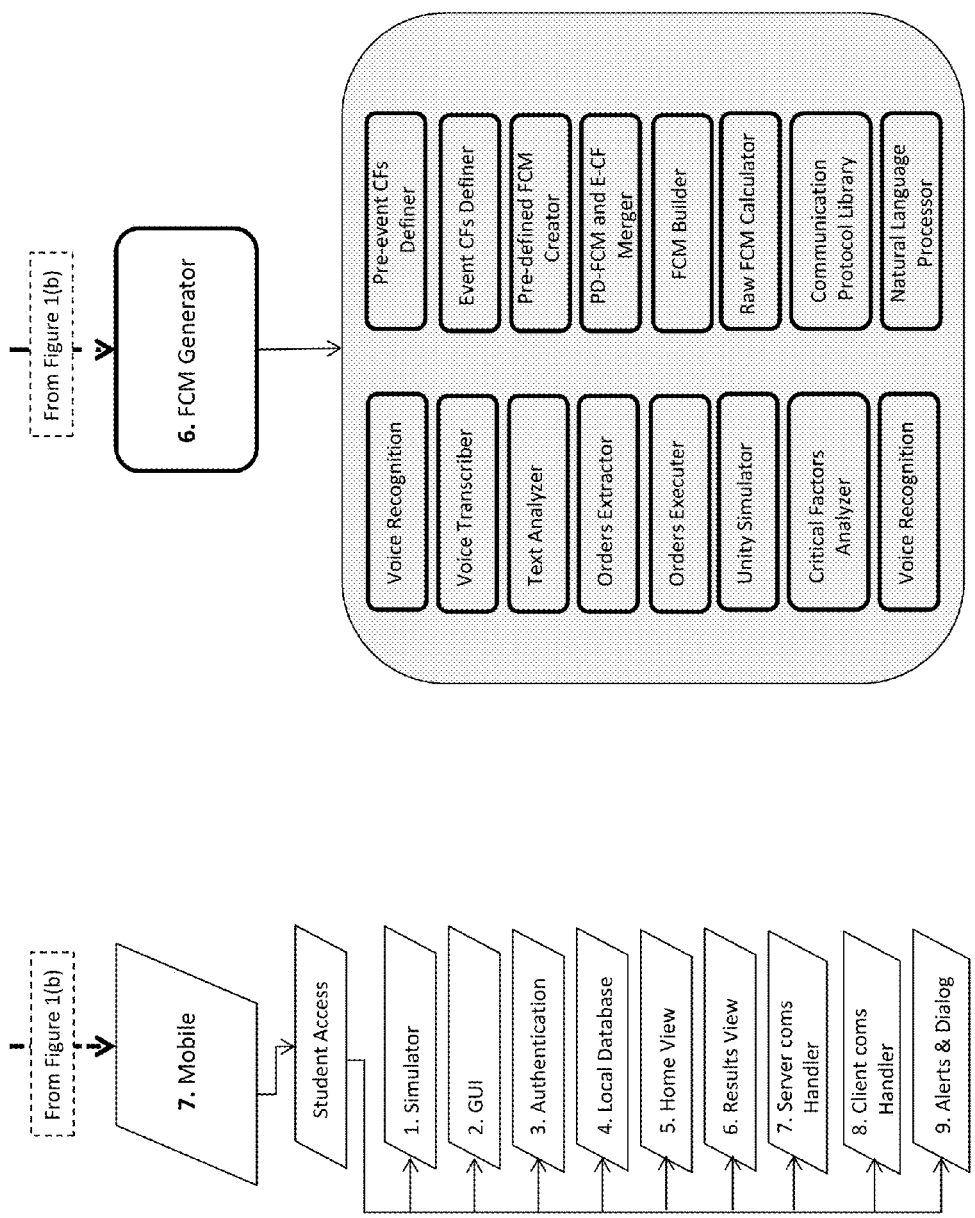
Figure 2:
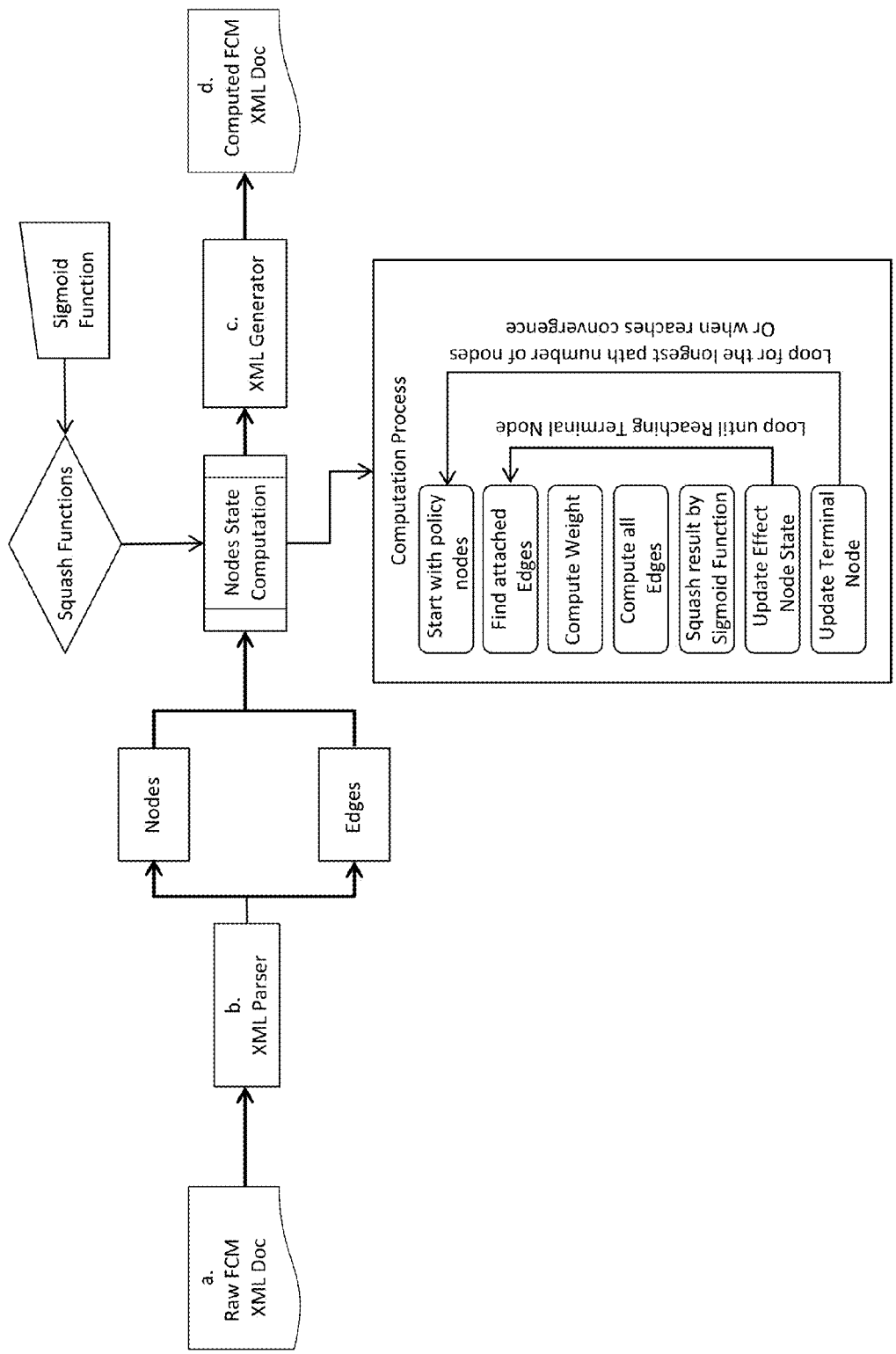
FIG. 2 is a schematic of the Fuzzy Cognitive Map (FCM) Engine.
Figure 3:
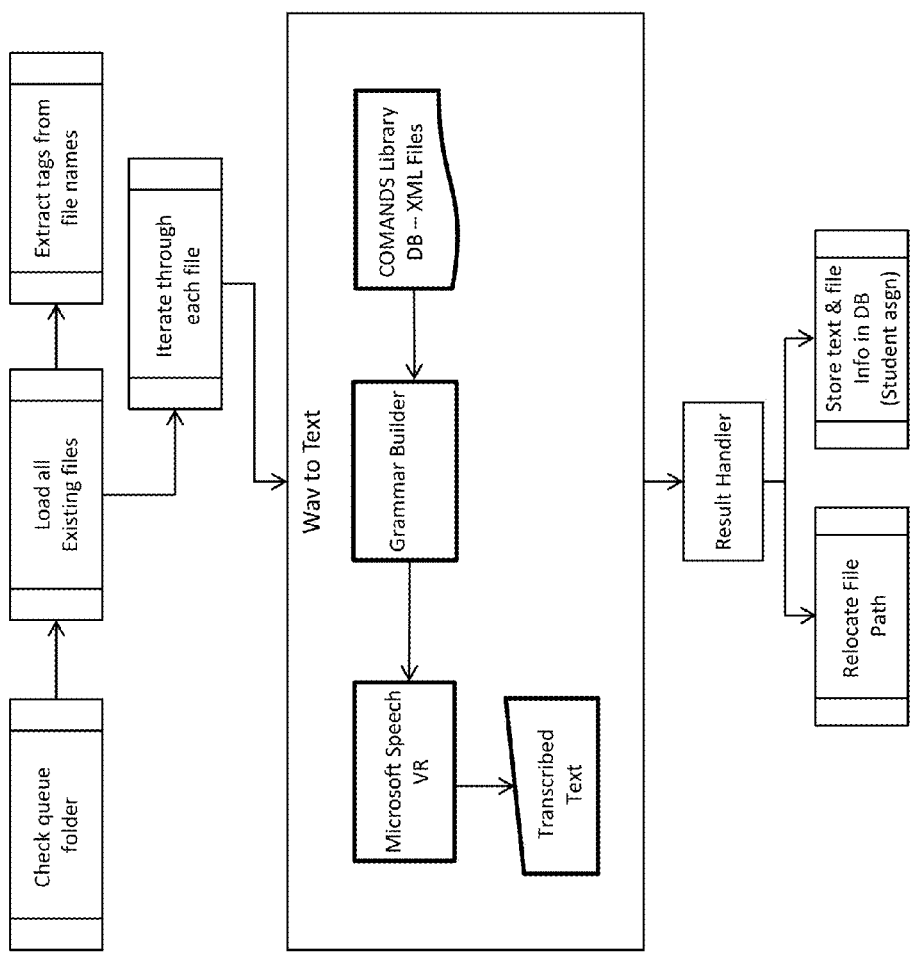
FIG. 3 is a schematic of the FCM VR Engine.
Figure 4:
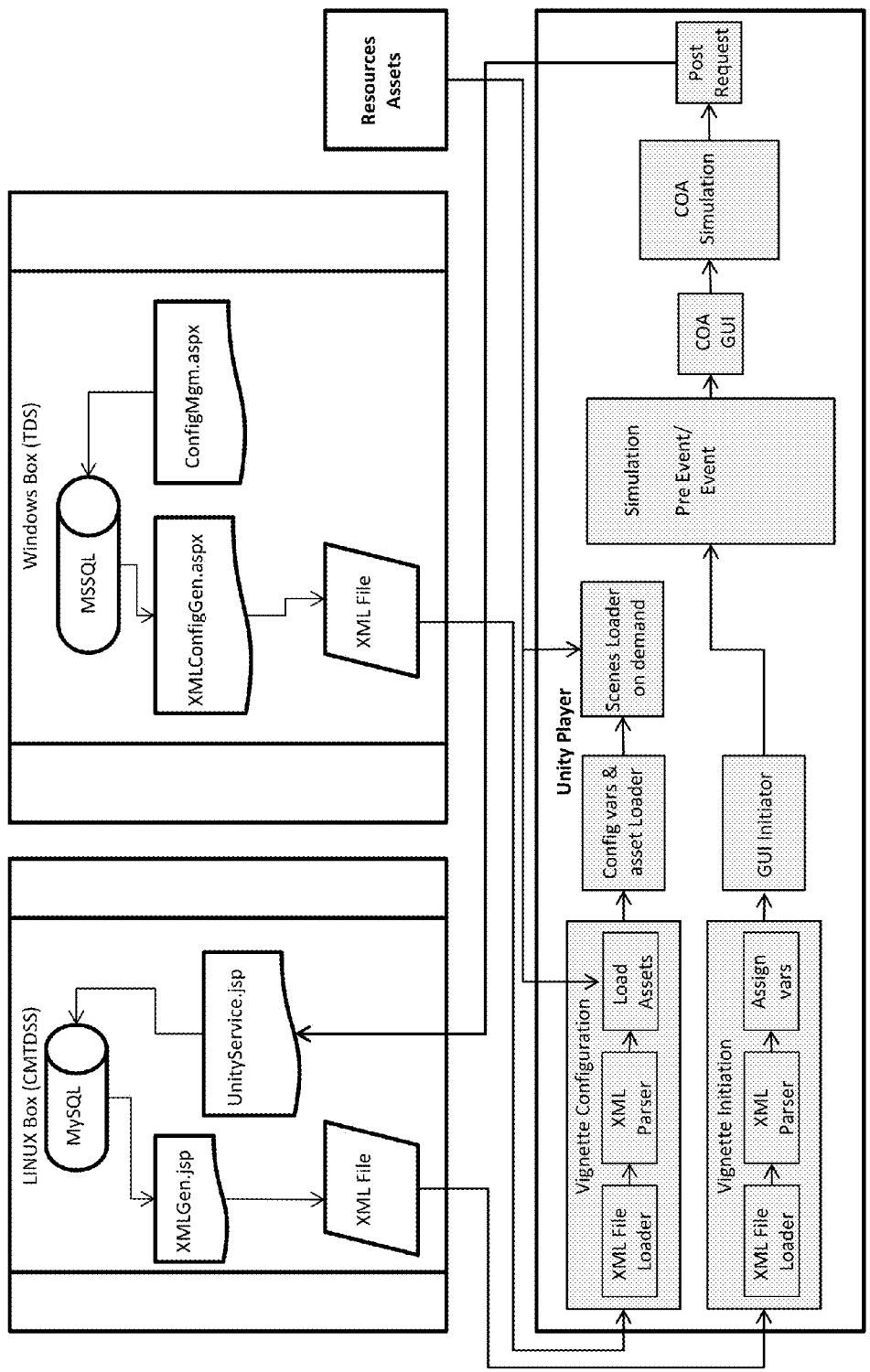
FIG. 4 is a schematic of the Unity 3D Simulator within CMTrainer.
Figure 5:
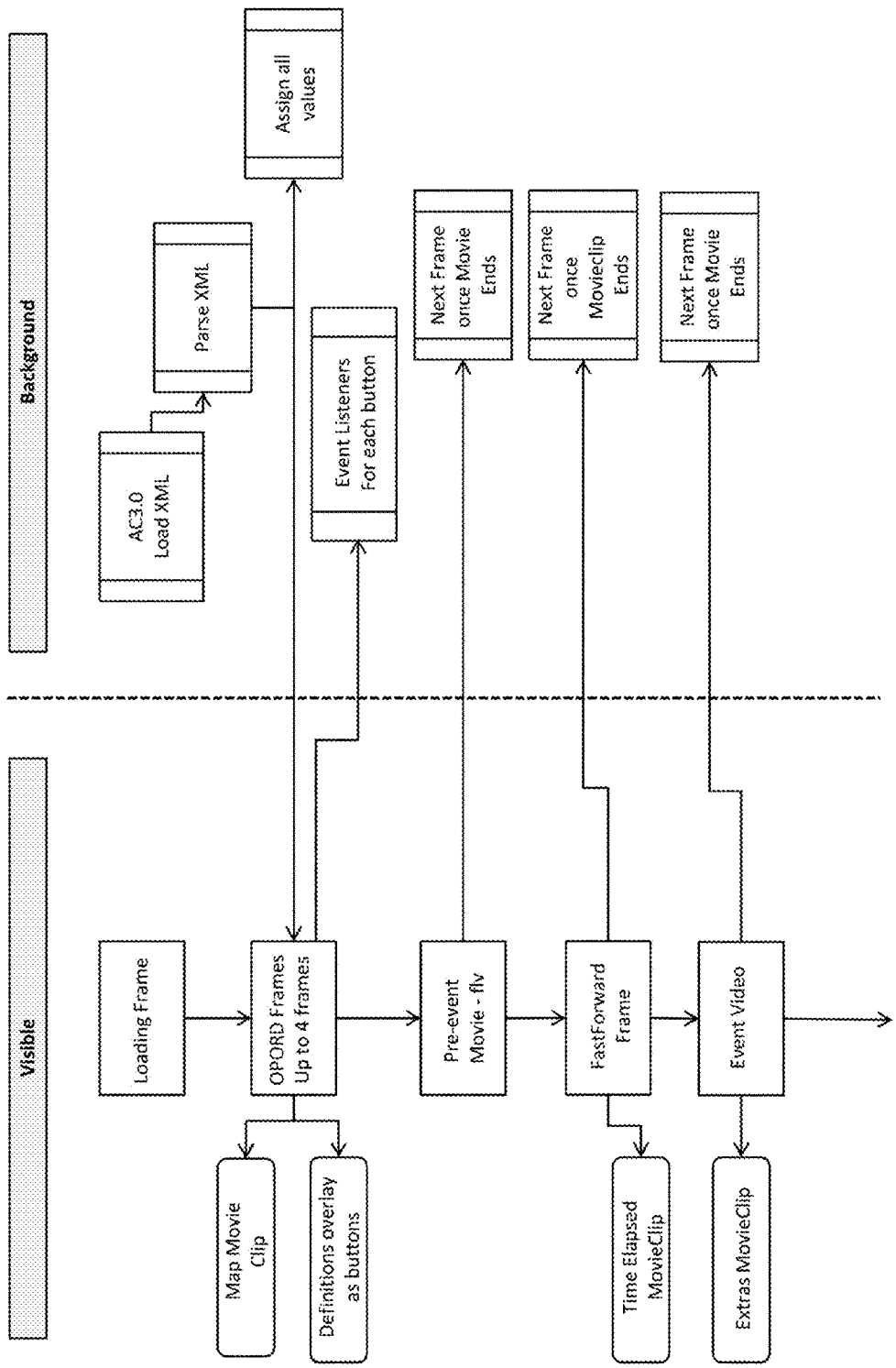
Figure 5:
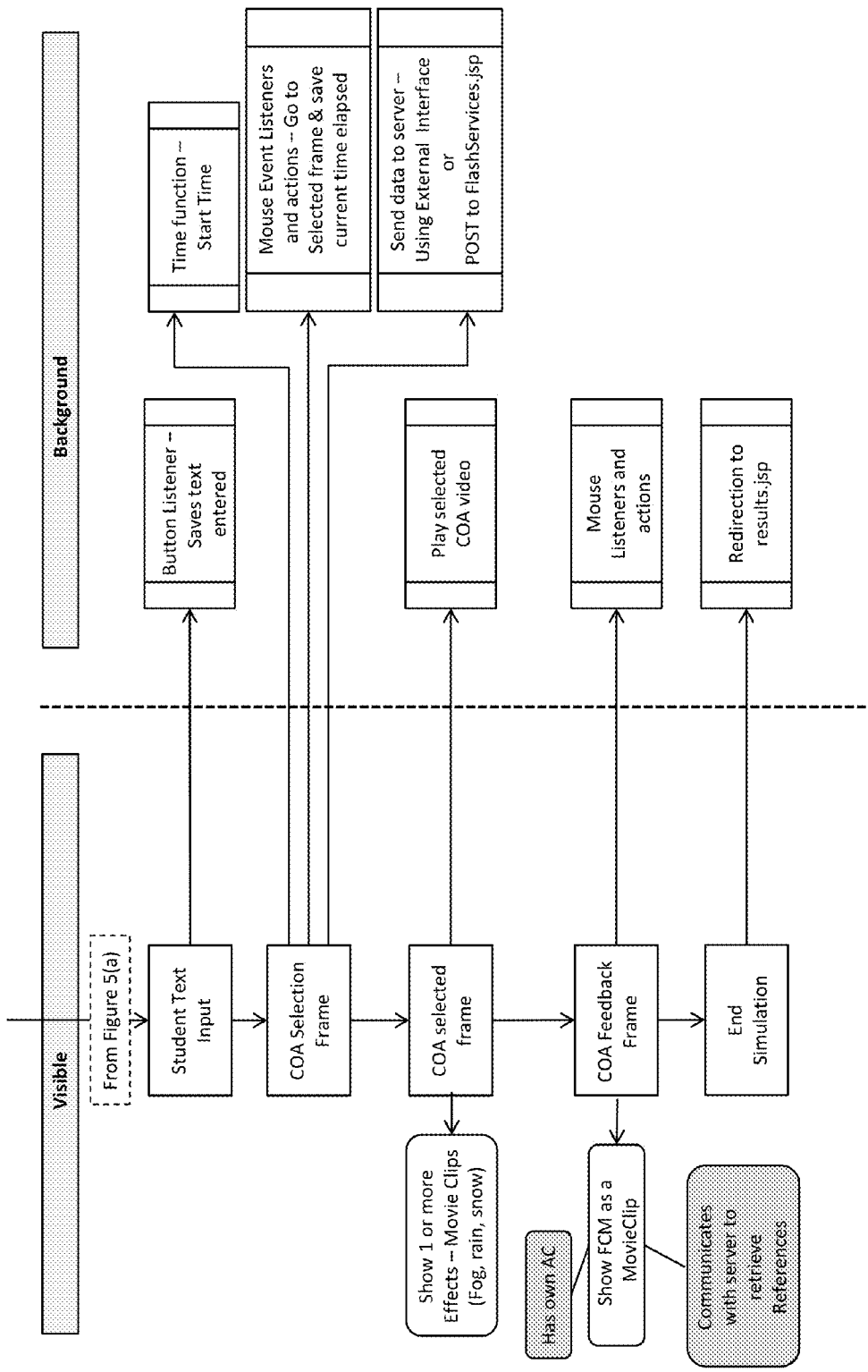
Figure 6:
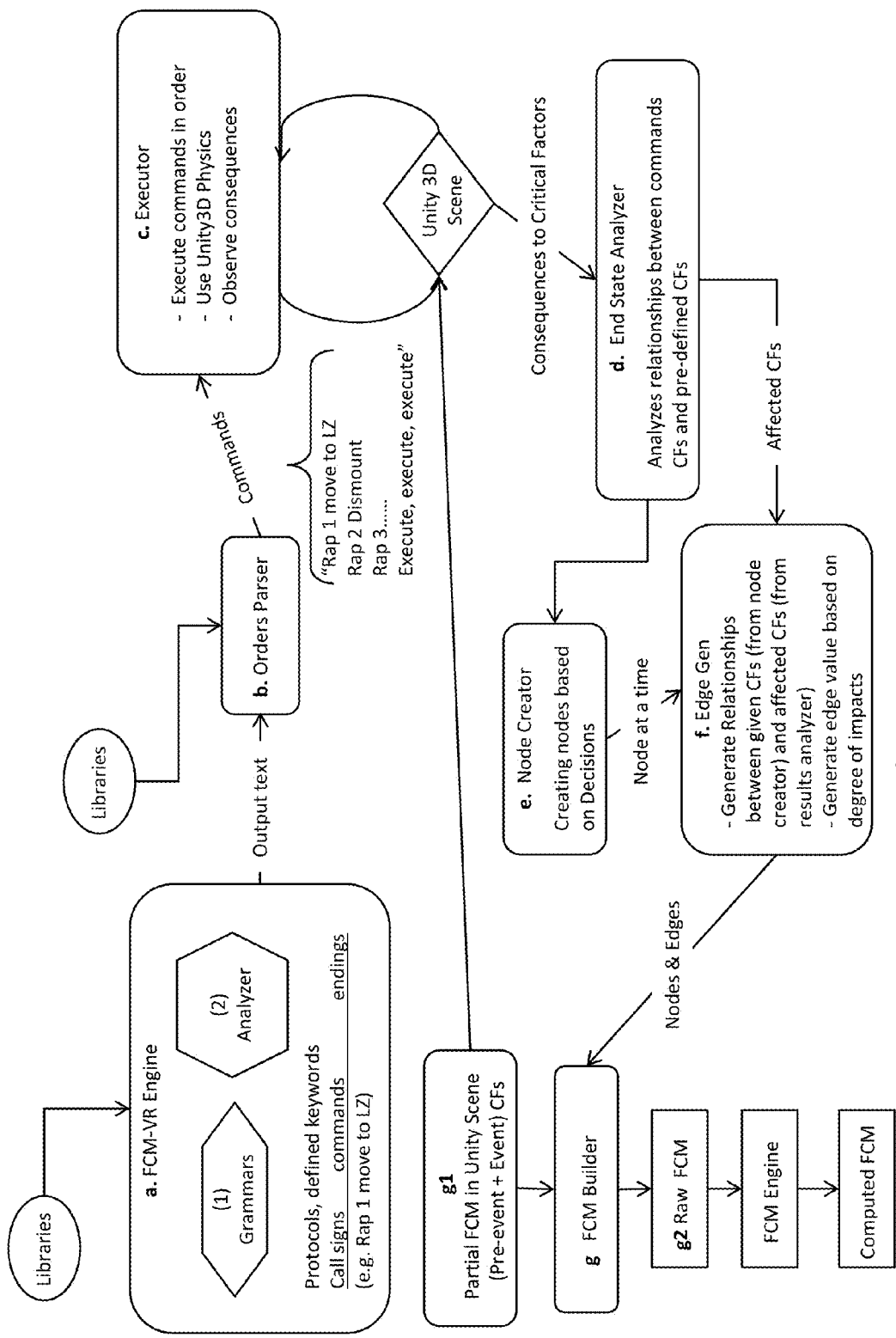
Figure 7:
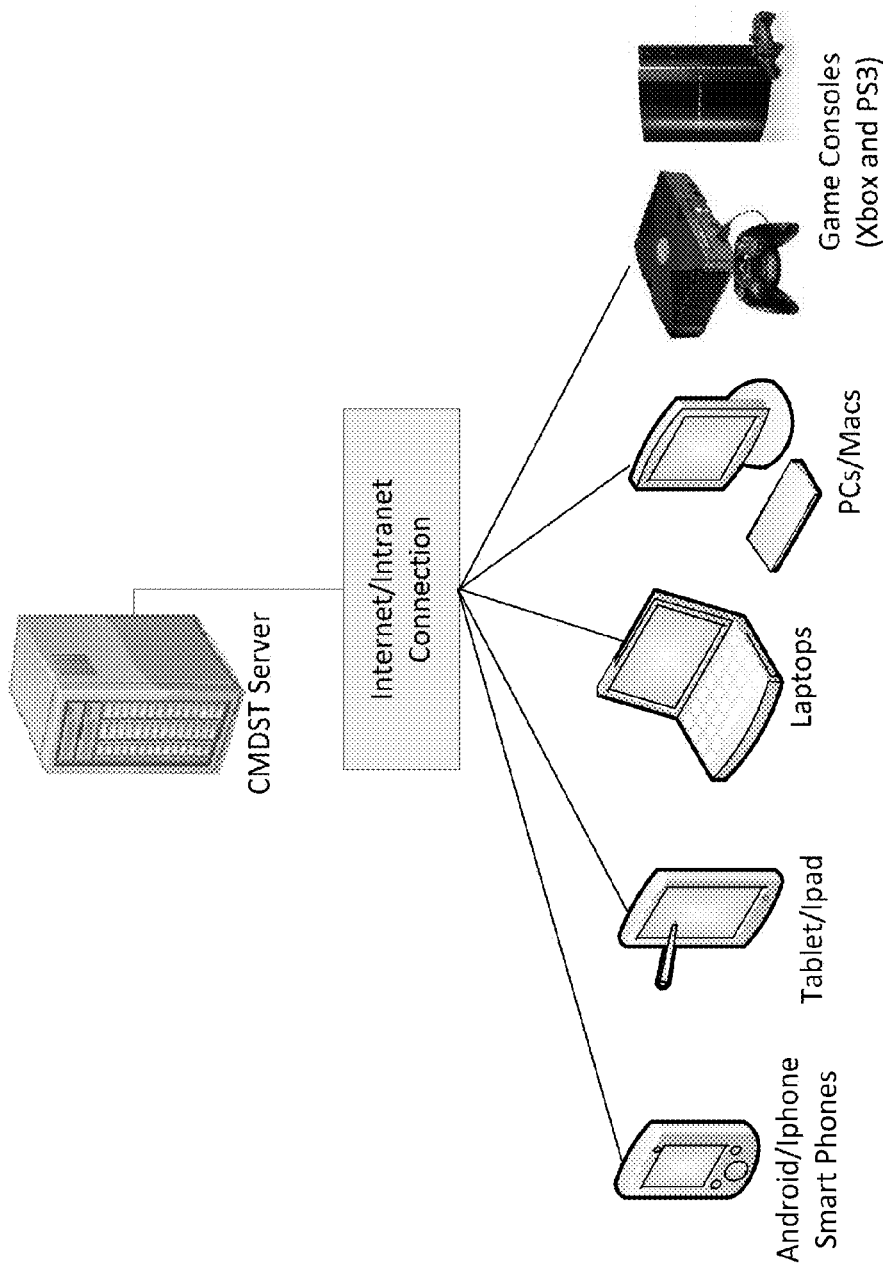
Figure 8:
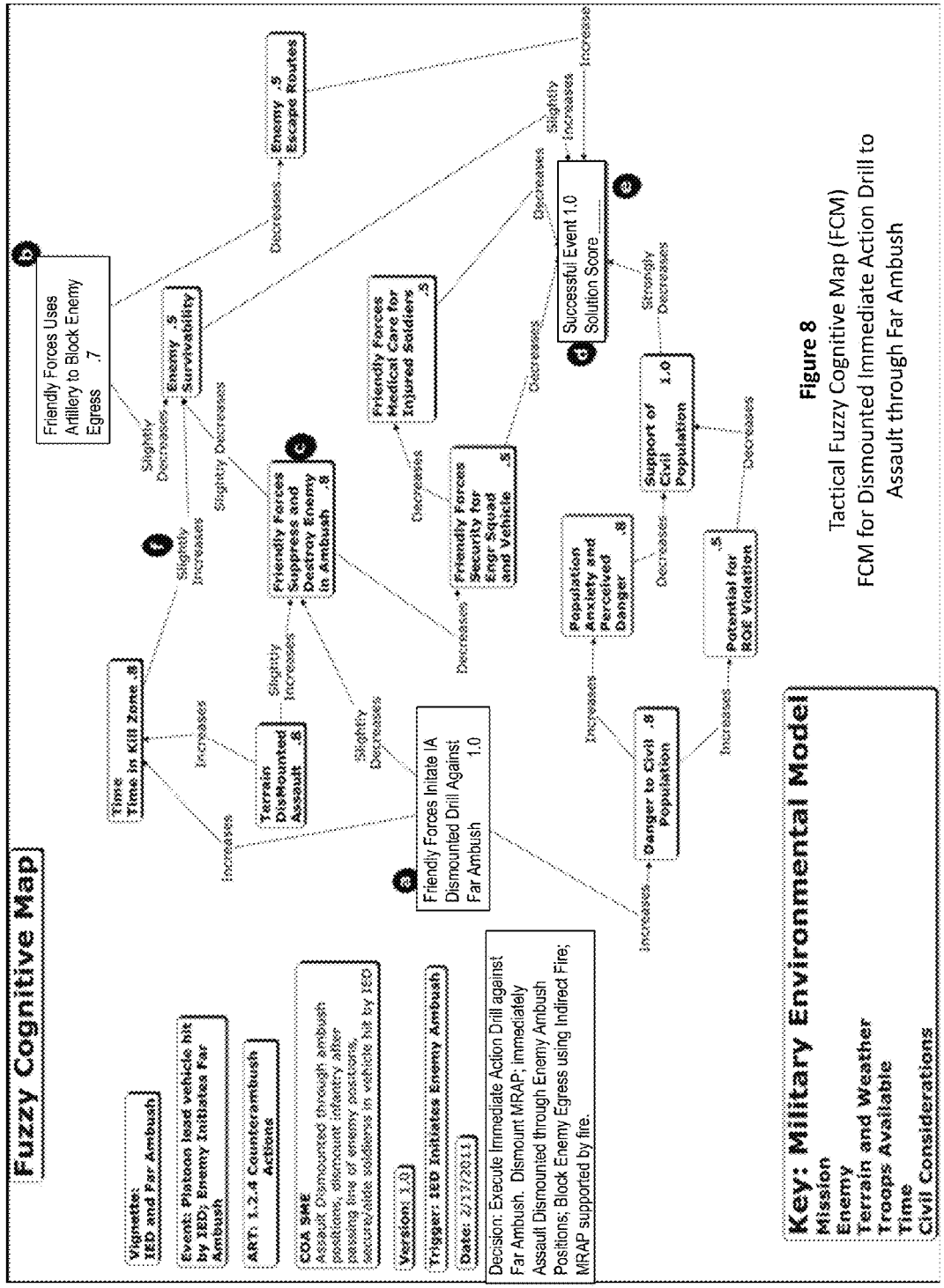
Figure 9:
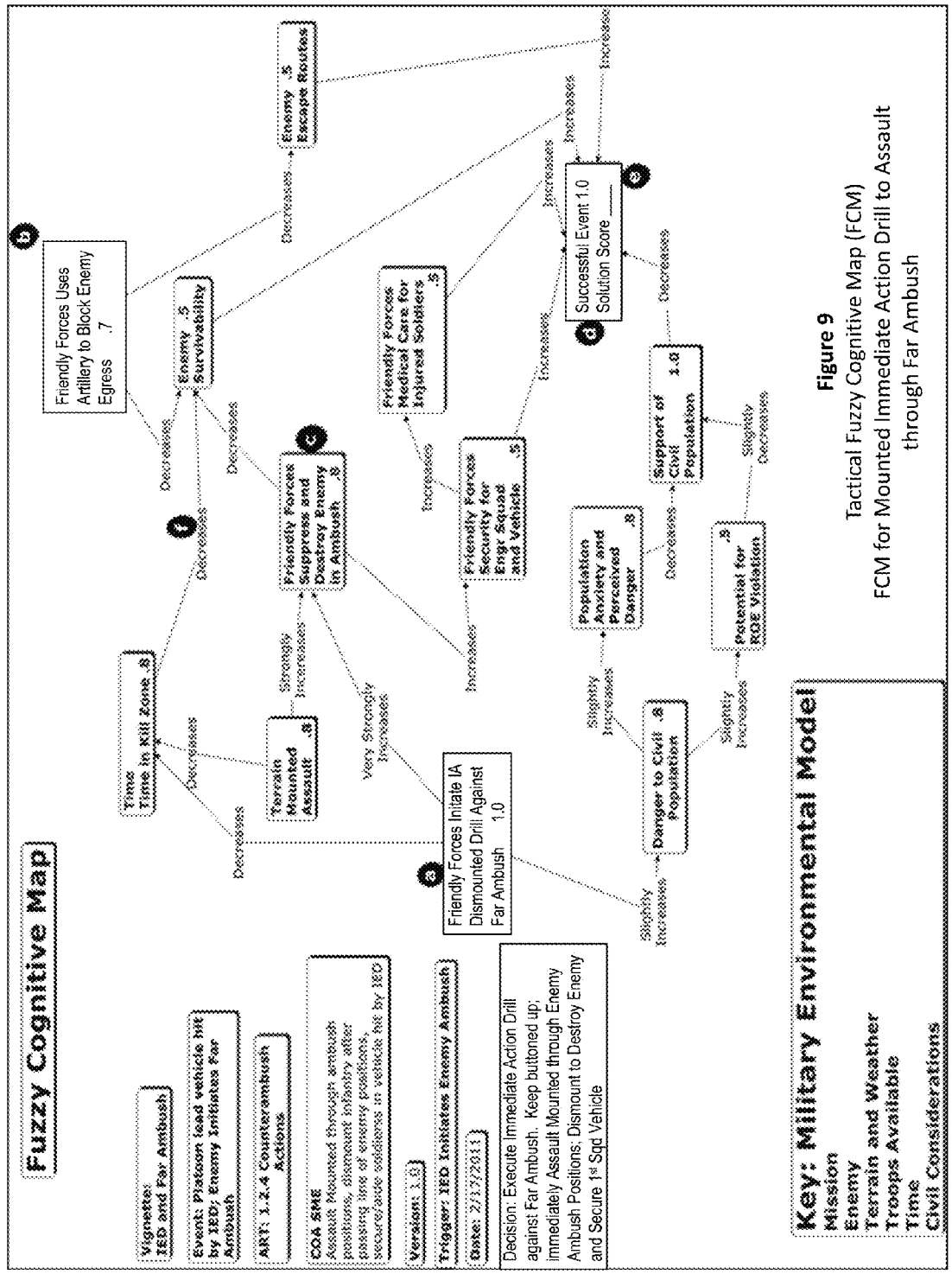
Figure 10:
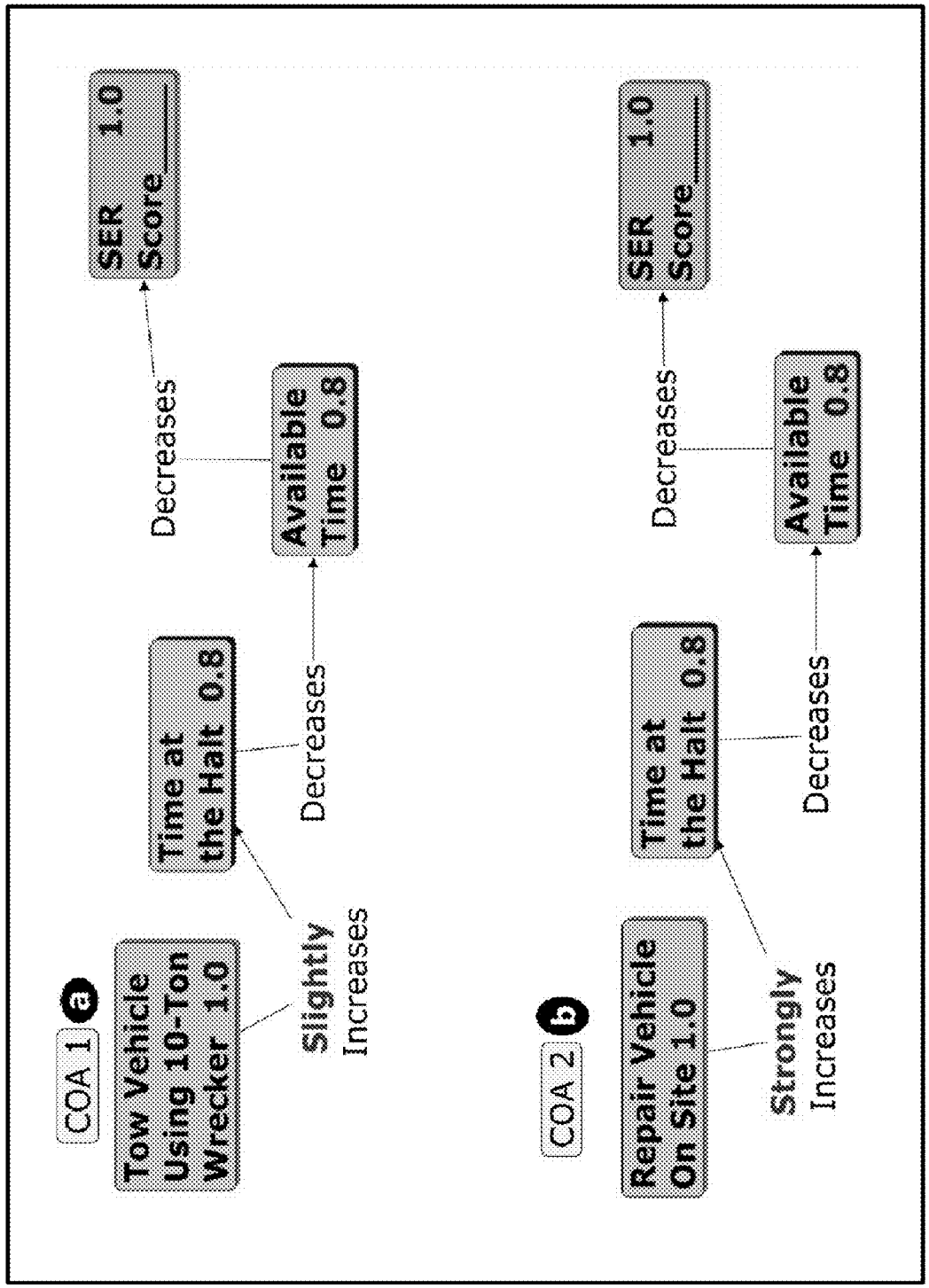
Figure 11:
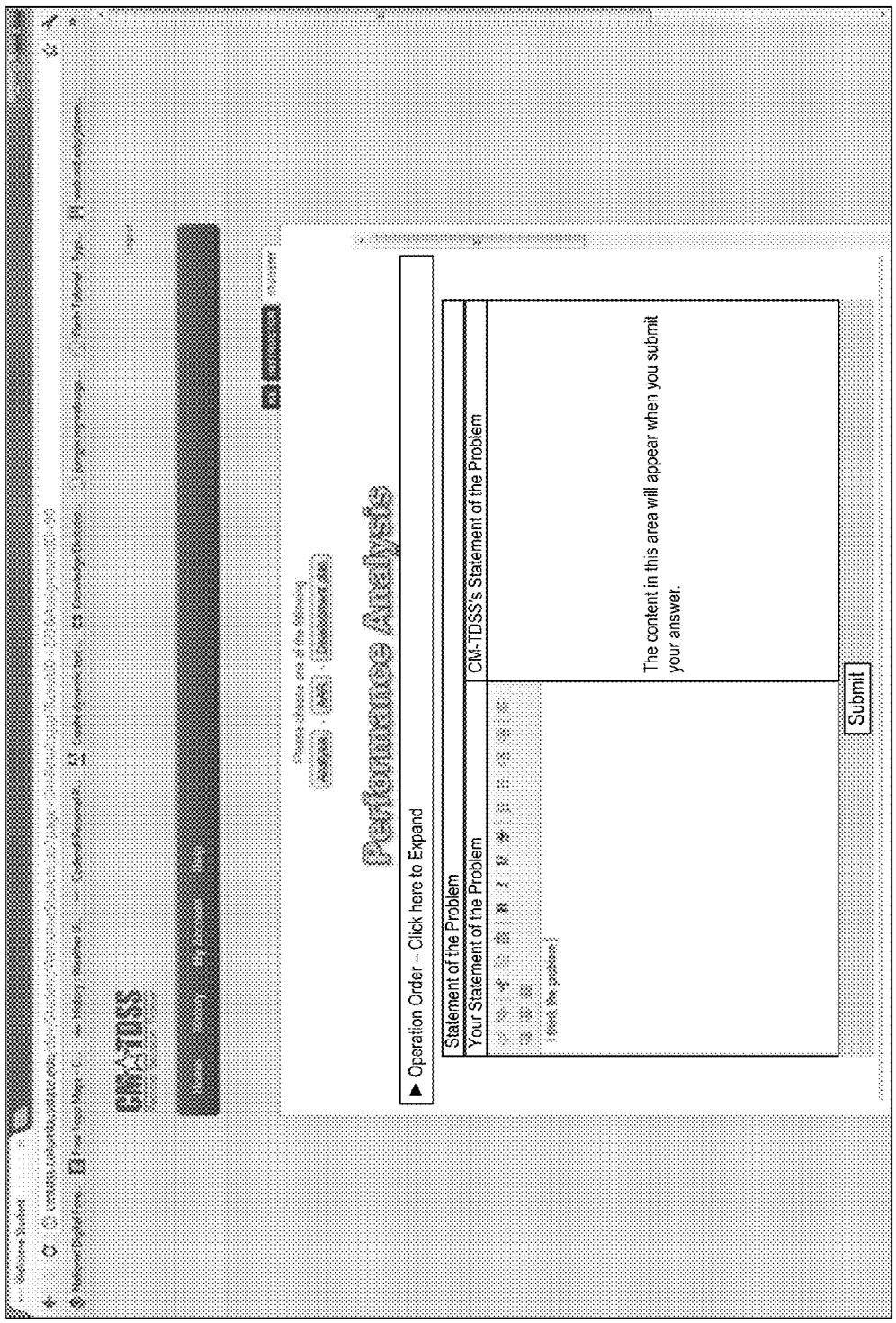
Figure 12:
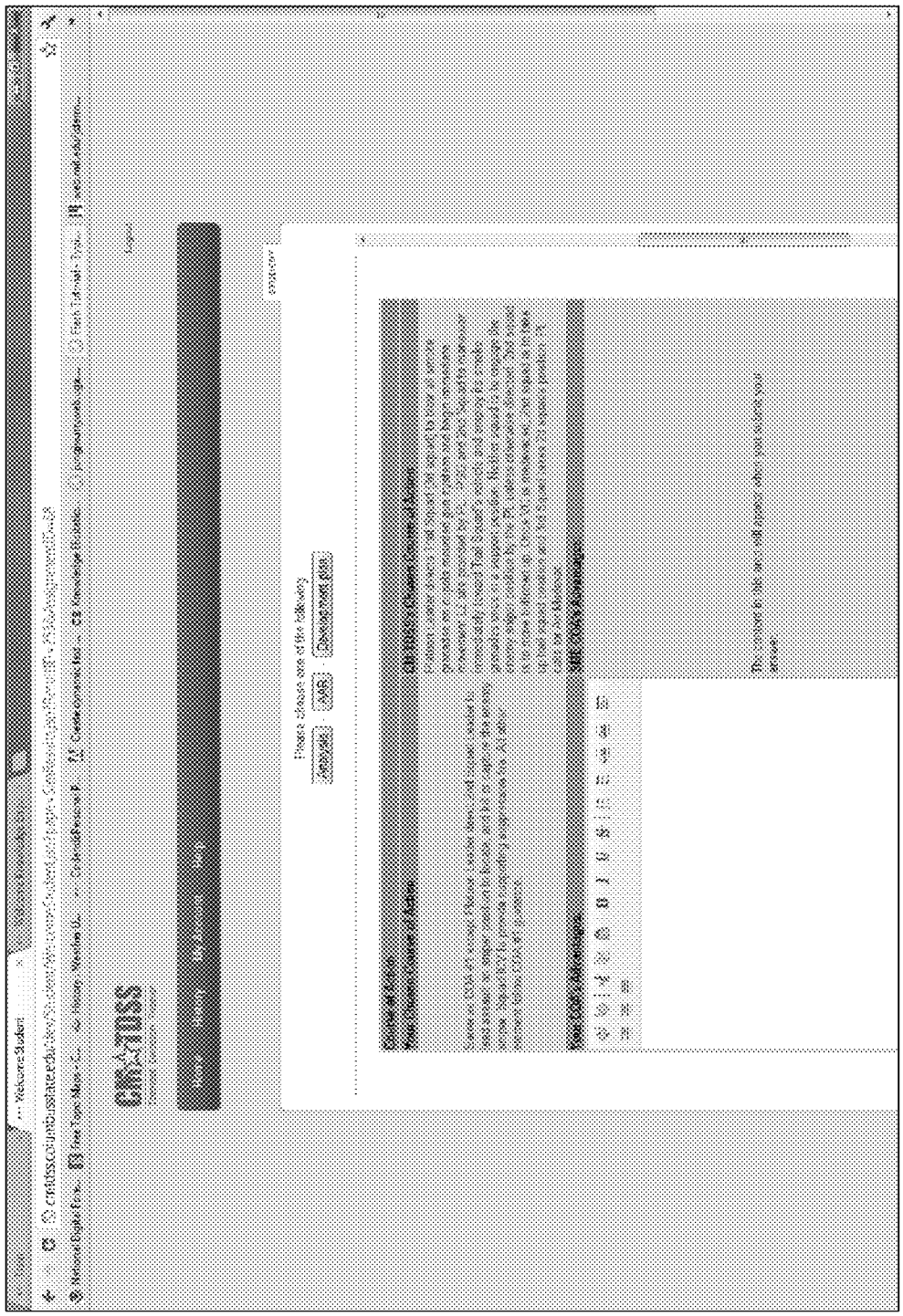

FIGS. 5(a) and 5(b) illustrate a schematic of the Flash Simulator structure within CMTrainer;

FIG. 6 is a schematic of the FCM Generator Components;

FIG. 7 is a drawing of the platforms that are compatible with the CMDST system;

FIG. 8 is a tactical FCM depicting the decision to conduct a platoon immediate action drill to assault dismounted into a far ambush;

FIG. 9 is a tactical FCM depicting the decision to conduct a platoon immediate action drill to assault mounted into a far ambush;

FIG. 10 is a drawing FCM Nodes, Edges, and Values and their relationships with one another;

FIG. 11 is a screen shot of the Performance Analysis;

FIG. 12 is a screen shot of the Performance Analysis FCM; and

Figure 13:
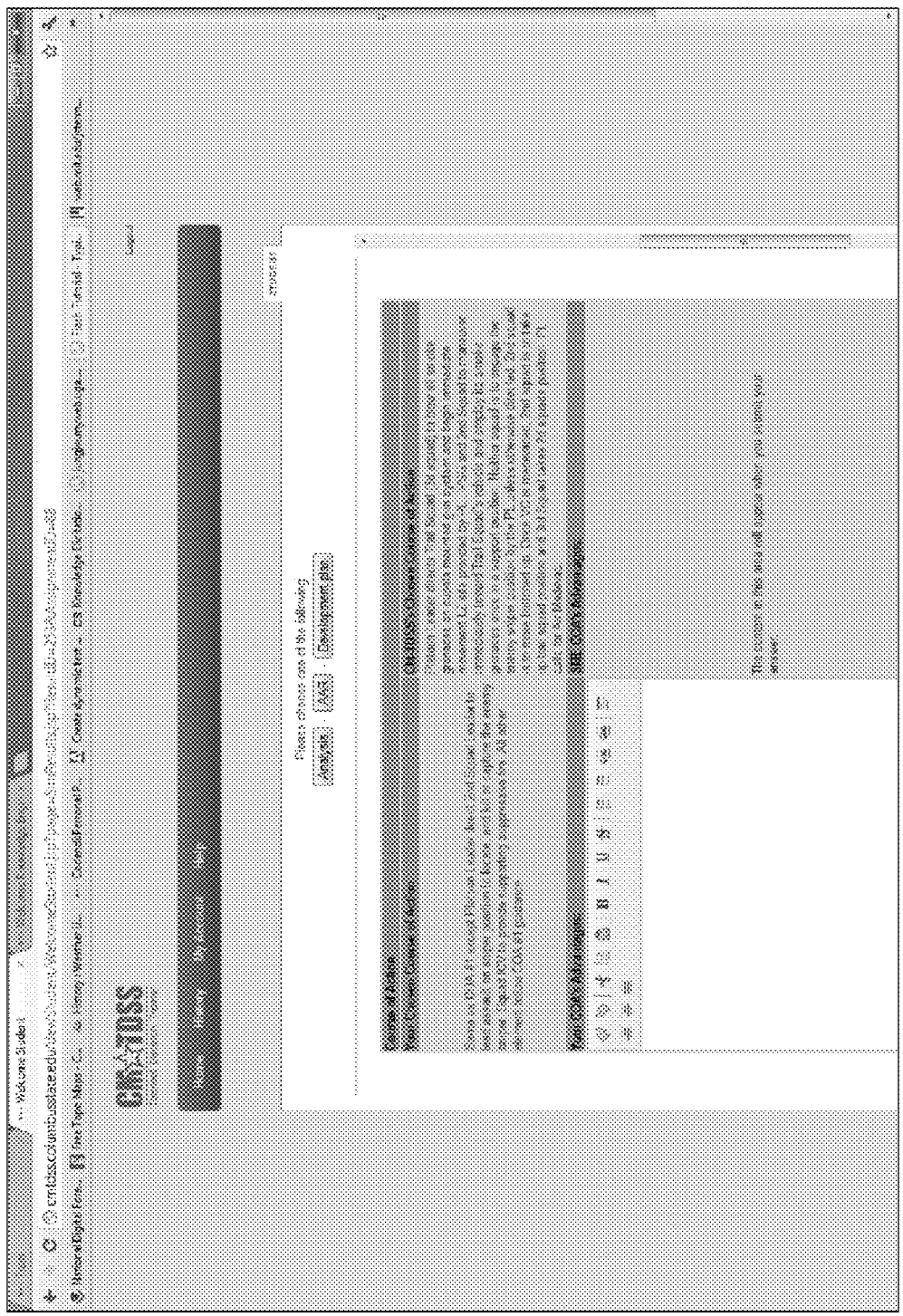

FIG. 13 is a screen shot of further Performance Analysis.

DETAILED DESCRIPTION OF THE DISCLOSURE

Overview

Today's technology offers us an opportunity to improve human performance. While the tactical leader's ability to make better decisions has been enhanced by technology and the availability of more timely and higher quality information, little has been done to improve the leader's ability to make tactical decisions. However, the technology is now available to enhance leaders' cognitive abilities through virtual experiences created while engaging in increasingly complex and challenging tactical simulations. This growing library of virtual, tactical experiences when combined with their training and actual combat experiences provides and ever expanding experiential base upon which intuitive decisions rely. Accordingly, it is through the technology of virtual experiences that modern leaders can for the first time dramatically improve their decision making competency.

As disclosed herein, a solution to improving tactical decision making competency is the cognitive map based decision simulation and trainer (CMDST). Unfortunately, junior leaders do not receive training or learning that focuses exclusively on decision making; if decision making is evaluated at all it is evaluated as a component of their overall tactical leadership performance.

The argument for focused decision making training is evident from numerous sources. Perhaps the most dramatic are the casualty statistics emerging from the conflicts in Iraq or Afghanistan that have now lasted for more than ten years. Over that span of time statistics show that the casualty rates for infantry platoon leaders have been 1.6 times greater than that of any other rank or branch in the Army. Alone this statistic is not particularly surprising. Historically, since the beginning of modern warfare shortly after the American Civil War, infantrymen and their junior officers have suffered the highest casualties in times of conflict. However, the dramatic leveling of the casualty rate for infantry platoon leaders after their first three months of in combat is surprising. The conclusion to be drawn from these statistics is that if a platoon leader survives their first three months, then there is a good chance of returning home after completing a 12-month tour. The experience a platoon leader gains during that initial period is invaluable and serves them very well for the remainder of their tour.

In the past the term "baptism of fire" has been used to characterize this initial period of combat for any soldier. For junior leaders, it was a period of learning through a series of real life experiences requiring problem solving, continuous adaptation, creative thinking, and ultimately, timely decision making. In some cases those who survived were simply lucky, but more often than not those who survived did so because they learned both from what they did well and what they did poorly. The most successful leaders took the time to reflect on and analyze their performance in battle. They learned; they survived; they progressed; and, they succeeded. Today, there is no luxury of learning under combat conditions. Junior leaders should be provided the decision making competency they need so when they enter their first day of combat, they have already experienced their baptism of fire—this time virtually.

The iterative, analytical, and comprehensive nature of the training regimen employed by CMDST serves to create an ever expanding library of virtual decision making experiences; these experiences are stored in the novice's memory without differentiation with actual experiences. The experiences can be recalled when the novice is confronted by similar, actual situations in the future allowing the novice to make decisions that are more intuitive and representative of the quality and timely decisions made by practitioners with substantially greater actual domain, decision making experience.

CMDST Features and Operation

CMDST, as a virtual system, facilitates decision making with minimal resource requirements. A user of the system can be presented with situations which, if real subjects or equipment were used, would either be too costly, too dangerous, or too impractical to be a viable consideration. This is why flight simulators, computer models that simulate weapons effects, and car crash tests with digitized dummies are so valuable. CMDST also provides an almost infinite number of conditional variants that can be inserted into the virtual situation. This variety of situational presentations ensures uniqueness and helps maintain practitioner engagement. The analytical post-mortem that follows each simulated decision experience aids in decision understanding and retention of the experience. The 3D immersive nature of the situational presentations promotes engagement, interest, and concentration on the part of the practitioner. Each of these factors contributes to decision understanding and retention. The greatest advantage of CMDST is its ability to accelerate decision competency by compressing a substantial number of virtual experiences into an extremely truncated period of time as compared to the time it normally takes practitioners to accumulate a comparable number of actual experiences, either in training or combat.

In accordance with the present disclosure, the CMDST presents domain situations in the form of short 15 to 20-minute virtual vignettes with visual and sound components or a longer scenario in which several vignettes or events are linked together in an operational mission. The present disclosure may present realistic tactical problems, and requiring users to make rapid decisions consistent with the situation and nature of the problem encountered. The decision is communicated to the leader's subordinates using communications protocols appropriate to the decision. A simulation is created by the FCM Generator that accurately reflects the leader's decision and the simulation continues the action from the point of the event through the vignettes conclusion.

For example, a scenario might include more than the execution phase of the operation. The scenario always includes the preparation of the operations order and some, if not all, of the troop leading procedures. The advantage of learning with scenarios is it links planning to the operation. This is important because many execution problems are the result of planning omissions or errors. The major disadvantage of a scenario is the length of time required to execute a single scenario. Scenarios are intended for advanced learning and not intended to be included in the present disclosure as a claim. For this reason the focus of the present disclosure is on the vignette.

Vignettes can be delivered using the web or DVD and played using several different platforms including: personal computers, desktop or laptop computers, notebook computers, tablets and smart phones. The flexibility of CMDST is intentional in order to provide users extensive latitude in when and where they can access the system. The vignette is comprised of three parts. The first part contains the information necessary to give the practitioner sufficient background and context to understand the nature of the operating environment and tactical mission. The second part is the video/audio component. It portrays a virtual but realistic operational environment. Once the practitioner has had an opportunity to establish a situational understanding of their virtual environment (usually no more than 30-seconds), a cue is triggered to alert the practitioner that something has occurred requiring a decision to be made. The cue could be visual or aural or both. The nature of the cue will indicate the sense of urgency with which the practitioner should approach the problem or enemy engagement and ultimately their decision.

When the practitioner makes a decision they will be required to communicate directions or orders to their subordinates requiring them to act. Cameras will digitally record the practitioner's actions while microphones will capture any verbal directions. Both the visually recorded actions and the verbal directions are digitally transmitted to a fuzzy cognitive map (FCM) generator which interprets the visual actions and verbal directive and converts them into an FCM replicating the practitioner's decision.

The tactical FCM includes nodes which represent critical decision factors. These critical decision factors are derived from models that represent the factors comprising the operating environment. Only those factors that bear directly on the solution needed to resolve the problem are presented to the practitioner in the vignette. A tactical FCM contains three types of nodes: policy nodes, cause and effect nodes, and the successful event resolution (SER) node. The CDF nodes are arrayed from right to left on the FCM with the decision nodes to the left, the cause and effect nodes in the center, and the SER node to the extreme right. All nodes have values from 0 to 1.0. However, policy nodes invariably have a value of 1.0. The nodes are connected by edges or arrows on the FCM. These arrows have a directional influence and value components. The arrow reflects which nodes are the affected node and which are the effecting node. The base of the arrow is attached to effecting nodes while the arrow head is attached to the affected node. The edges (or arrows) value is determined by the strength of the relationship the effecting node has on the affected node(s). Policy nodes only affect other nodes, they are never affected themselves. Policy nodes can affect one or more cause/effect node(s). Cause and effect nodes can be affected by one or more policy or other cause and effect nodes. Cause and effect nodes can also be affected by one or more policy or cause and effect nodes. The SER node can only be affected by other nodes and there is only one SER node per FCM. During the simulation of the student course of action/decision, a SER score is calculated and shown in the SER node's lower right hand corner. The SER score is a quality score ranging between 0 and 1.0 that can be used to compare the quality of a decision selected to resolve a specific course of action.

The SER score has no relevance except within the context of the specific problem or engagement. The student's SER score, as a measure of quality for their chosen course of action and associated decision, can be compared to the SER score derived from the simulation of the SME's FCM. This measure of quality for the FCM's simulation is a computational value derived by executing a mathematical function using the various nodal and edge values within the FCM. The FCM can also be used as a visual aid to assist the student in understanding the critical decision factors that characterize a particular problem or engagement. In this context the FCM is used to identify the critical decision factors, their value or importance to resolving the problem, their relationship and influence on one another, and the nature and strength of the relationship. All of the critical defense factors represent various elements of the environmental model which in the case of tactical FCM is the METT-TC model. The specific nature of the FCM, its construction, and use will be discussed at greater length in the Detailed Description of the Disclosure section to follow.

The third and last component of the vignette is the Performance Analysis, Review, and Development Plan. These actions begin once the simulation has concluded. The performance analysis involves asking the practitioner a series of questions regarding their decision. Their responses are typed into the template provided and continually contrasted with responses developed by the system's expert. Once the student responds, they are then asked to compare the responses with those of the system's expert. The questions and comparison requirements directed at the practitioner involve problem identification, factors critical to making the decision, comparison of the FCM generated for the practitioner's decision with the system expert's FCM, and finally a comparison of the practitioner's decision with the system expert's decision, and the oral communication used to transmit their decision.

Once the analysis is complete the system then moves to a self-directed after action review (AAR). A self-directed AAR is completed by the individual practitioner with the assistance of an intelligent tutor. The format of the AAR follows the generally accepted principles for an AAR. The last part of the AAR asks the practitioner what they need to do differently to improve their decision making competency as determined from their performance analysis and AAR. This provides the lead in to the final part of the vignette, the Individual Decision Making Development Plan (IDMDP).

The IDMDP is a standard template used to record actions the practitioner intends to take to improve their decision making competency. It involves specific tasks and times for completion. The intelligent tutor can assist the practitioner in preparing the IDMDP. Once the IDMDP is complete and entered into the system the vignette session is complete.

The three steps following the simulation: the performance analysis, AAR, and development plan are key elements of the learning process. During the in-depth review and AAR, discovery takes place. Discovery is the highest form of learning and helps in aiding retention of the experience. Discovery occurs through the detailed analysis and review. Lessons are learned, insight is gained, and inferences are made. The experience is initially stored in the student's short term memory and transferred to long term memory at some in the future. When stored in long term memory the experience is associated with specific, related conditional elements, perhaps totally unrelated in some cases to the original event. However, when the conditions at some future date match the conditions surrounding the experience in memory, the brain is capable of using the information and linking it to decisions that must be made in the present. This is what is known as intuitive decision making. The more the student uses and learns from their vignette experiences, the more the student reinforces and adds to their library of overall tactical experiences. This makes the student a better tactical decision maker, builds their tactical confidence and competence, and ultimately makes them a much more effective and decisive leader.

The last step in the process is to complete the individual decision making leader action plan which is based on and may be linked to the U.S. Army's Handbook for Self Development. This includes a simple but effective review of their decision making strengths and weaknesses, a summary of what they learned about their decision making competency from the vignette, and what they intend to improve prior to engaging in the next vignette. The leader's response may involve tactics, techniques, or procedures. The leader may identify situational awareness, employment of enablers, or their ability to manage stress. Regardless of the area the leader selected for improvement they must select a specific action to undertake to overcome the identified area for improvement.

CMDST uses a unique fuzzy cognitive map (FCM) that reflects only the critical decision factors inherent in the specific decision with which it is aligned in accordance with an environmental model that captures all of the major factors within that specific domain. The process of aligning a domain model with an FCM that reflects the critical factors and only the critical factors from a domain model is a unique process in decision making modeling.

The process of calculating a specific FCM value for each option or course of action and its associated FCM for a given decision is new in decision making modeling. This value is termed the successful event resolution (SER) value. It represents a relative value by which the possibility of successfully resolving a problem via a given solution is projected. The SER value is a terminal value representing the interaction of all nodes (critical decision factors) through their respective edges and their corresponding values using specified mathematical functions to calculate the cascading values until the SER node value is determined and convergence is achieved.

CMDST uses a unique software process to generate an FCM representative of the decision made by a domain practitioner following their viewing of a problem portrayed during a brief immersive vignette which places the student in a tactical operating environment. The software process used generates the FCM view of the decision solution and inherent critical factors associated with the student's decision. The decision solution is transmitted orally by the student to others (subordinates or assistants or others) who are expected to act on their decision (actions and/or communications) to effect the decision or the practitioner himself takes action to implement their decision. The process begins with the student's decision which is reflected by their actions and/or verbal communications to others to execute their/her decision. These actions and or verbal commands must be converted to digital representations that are used to build the student FCM. The student's verbal communications first are converted via voice recognition systems to digital means that are sent to an FCM generator which interprets the digital transmissions and converts them to values associated with specific effect nodes. Each node is placed within a relational framework with connecting edges that represents the relation and its value within the context of the student's decision. The visual actions of the student (if germane to the decision) are captured by a digital representation and interpreted by a visual component within the FCM generator.

Once the new leader has met certain established criteria, they will be allowed to advance to the next, non-prompted phase in the use of the CMDST system. The essential difference between the unprompted phase and the prompted is the presence of the Fuzzy Cognitive Map (FCM) Generator in the non-prompted phase. The FCM Generator is one of the major and unique aspects of the CMDST system in that enables the simulation to continue uninterrupted from the time the student begins the simulation until it concludes. There are no artificial prompts. The simulation is executed exactly as it would be on a tactical battlefield; i.e., the student must identify correctly identify the problem when it occurs, they must accurately determine how much time they have to make a decision, they must correctly identify the critical decision factors impacting their decision, they must then select a course of action of their own creation and convert the course of action into an oral command that correctly captures their decision, and communicate that command to all subordinates and attached leaders using appropriate communication protocol. The FCM Generator receives the student's voice input from CMTrainer and performs a natural language translation of the student's oral FRAGO. The order content is extracted and the Unity Simulator is used to prepare the order for execution. The FCM Generator simultaneously builds a tactical FCM to replicate the new student's developed course of action; e.g., decision.

The CMDST system may be used beyond institutional training Once the new leader graduates from their institutional course they move to their first assignment in an operational unit. While in transit they have the opportunity to continue developing their competency using the CMDST system. Upon arriving at their unit, they can continue on a training strategy for vignettes for their type unit or, if their commander trains junior officers using CMDST, the training strategy will be modified in accordance with the commander's training plan. The commander's CMDST system training requirements may include peer and/or collaborative training augmented by individual self-directed decision making development executed by the officer on their own time.

The platoon leader can use CMDST to help develop leader cohesion with their squad leaders and platoon sergeant through the conduct of squad and platoon linked vignettes. These are especially helpful in preparing for home station FTX/STX's, training center rotations, and deployments overseas. CMDST can also be modified to accommodate unit mission essential task list (METL) training based on designated contingency plans.

Finally, the CMDST system becomes an invaluable aid during rotations to a combat theater. In this regard, it is extremely helpful in vetting and confirming operational plans, pre-rehearsal leader preparation for in advance of operational missions, and following operations CMDST is useful during the conduct of AAR's and debriefings. CMDST is an extremely flexible and valuable tool designed to aid in developing individual and small unit leader decision making competency.

CMDST can be used anywhere there is internet connectivity. It is compatible with multiple smartphones, tablet and notebook computers, and laptop and desk top computers. It can be used by individuals in a self-directed or peer-directed mode or it can be used collectively to train leaders in a vertical context. Lastly, it can be used at the institution or the operational force, by the active or the reserve component, during duty and after duty, in garrison or while having a latte at Starbucks. With the CMDST system opportunities for decision making development are boundless.

Example Implementation

The present disclosure can be continually displayed on the systems shown in FIGS. 1 through FIG. 9. The present disclosure, as shown in the schematic at FIG. 1, consists of the following components:

(a) CMDST Utilities 1.
(b) Knowledge Elicitation Tool (KnowET) 2.
(c) Fuzzy Cognitive Map (FCM) Engine 3.
(d) Cognitive Map Based Trainer (CMTrainer) 4.
(e) MySQL Data Base 5.
(f) Fuzzy Cognitive Map (FCM) Generator 6.
(g) Fuzzy Cognitive Map 7
(h) Vignette (or Scenario) 8.

The CMDST Utilities 1 include all of the website functions and operations to enable student, instructor/trainer/commander, and knowledge engineer access to and use of the CMDST system. The subcomponents for student interface a with and use of the system include:

(1) Assignments a1. The 'Assignments' interface presents to the student a list of assignments made accessible by their instructor, as well as specific information for each individual assignment, including: the date the assignment was posted, any instructions provided by the instructor, the due date of the assignment, and the assignment's completion status.
(2) Simulation results a2. The 'Simulation Results' interface presents to the student all information regarding a previously completed assignment. It includes simulation results for vignettes and scenarios.
(3) Manage Account a3. The 'Manage Account' interface allows the student to change information associated with their account, such as the student's e-mail address, password, and current rank.
(4) Performance Analysis a4. The 'Performance Analysis' interface presents the student with a series of questions designed to help the student reflect on the quality of their performance during a recently completed vignette or scenario. These questions and the student's answers are stored in the database for future reference.
(5) Analytics a5. The 'Analytics' interface reviews student performance data from previously completed assignments and compiles this data into statistical information.
(6) AAR a6. The 'After Action Review' interface presents the student with a series of questions designed to help the student reflect upon their decision during a recently completed vignette or scenario. These questions and the student's answers are stored in the database for future reference.
(7) Tutorials a7. The 'Tutorials' interface is designed to teach them how to use the CMDST system.
(8) References a8. The 'References' interface presents to the student a library of information taken from Army doctrinal or technical Manuals.
(9) Scenarios compatibility a9. The 'Scenarios Compatibility' interface presents to the student a list of scenarios suited to the current skill level of the student as determined by CMDST.
(10) Vignette Compatibility a10. The 'Vignette Compatibility' interface presents to the student a list of vignettes suited to the current skill level of the student as determined by CMDST.
(11) Flash Simulator a11. The 'Flash Simulator' interface presents to the student a simulated vignette via Adobe Flash Player. The student interacts with the Flash Player via keyboard and mouse input.
(12) Passed Due Assignments a12. The 'Passed Due Assignments' interface presents to the student a list of assignments that can no longer be attempted because their due date has passed.
(13) Individual Development Plan a13. The 'Personal Development Plan' interface presents to the student a series of questions designed to help the student document and plan their progress.
(14) Graphical Analysis 14a. The 'Graphical Analysis' interface presents to the student a series of charts and graphs depicting the statistical information compiled by the 'Analytics' student interface.
(15) Assignments Log 15a. The 'Assignments Log' interface provides the student with a list of previously completed assignments, as well as the ability to both review previously completed assignments and replay them.
(16) Unity Player 16a. The 'Unity Simulator' student interface presents to the student a simulated vignette via Unity Web Player. The student interacts with the Unity Web Player via keyboard and mouse input.
(17) FCM generator-based Unity Simulator 17a. The 'FCM-Generator Based Unity Simulator' interface presents to the student a simulated vignette via Unity Web Player. The student interacts with the Unity Web Player using vocal commands.

The subcomponents for Instructor/Trainer/Commander access b to and use of CMDST.

(1) Create Assignments b1. The Create Assignments web form presents instructors with a set of features that allow them to create new assignments and assigned them to a specific group of students or class. This web page is also linked to a simulation repository for a quick preview of simulations.
(2) Student/Individual subordinate performance b2. The capability for instructors to track each student's performance in regards of assignments, AAR, and Performance Analysis completed by the student.
(3) Modify simulations b3. The Modify Simulations feature allows instructors to tweak simulations' variants in order to create a custom simulation for a specific assignment.
(4) Manage account b4. The Manage Account web form includes settings and instructor's information that can be modified by the instructor.
(5) Graphical analysis b5. The Graphical Analysis feature is found in multiple locations in the instructor's web interface that includes graphs and charts representing specific statistical criteria of students' performances.
(6) Simulations Executor b6. The Simulation Executor feature is an algorithm that extracts all needed data from the database based on the passed parameters and passes them into a simulator to execute a specific simulation.
(7) Squad/Platoon/Unit analysis and Statistics b7. The Squad/Platoon/Unit analysis and Statistics page is a collection of features that present computed numeric and graphical statistics of a specific class or classes.
(8) Scenarios compatibility b8. The 'Scenarios Compatibility' instructor interface enables the instructor to view/set the current skill level of student/students.
(9) Vignettes compatibility b9. The Vignettes compatibility instructor interface enables the instructor to view/set the current skill level of student/students.
(10) Instructor/Trainer/Commander tutorial b10. The Instructor/Trainer/Commander tutorial is a collection of web pages that train the instructor how to use the system.
(11) Modify vignettes b11. The Modify Vignettes feature allows instructors to modify specific variants of a vignette.
(12) Modify scenarios b12. The Modify Scenarios feature allows instructors to modify specific variants of scenarios.
(13) Assignment Log b13. The Assignment Log keeps track of all assignments assigned by the assigning instructor with a time stamp.
(14) Modify AAR questions b14. The Modify AAR Questions web form enables instructors to write their own AAR questions or use existing ones from the library
(15) Individual and collective analytics b15. Individual and Collective Analytics is an extension of Analytics and Statistics collection that's limited to individual students with greater details of their activities and performances.
(16) Replay student assignments b16. Replay Simulator feature is a tool to execute a specific students' assignment. The replay shows how the student reacted to the assignment, response time, the given verbal command. The instructor also has the ability to view the simulation from different angles or by flying around the virtual world.
(17) Raw Simulation Executor b17. The Raw Simulation Executor is a tool that executes raw simulations from the library. This allows instructors to examine simulations before assignment.
(18) FCM generator-based Unity simulator b18. FCM generator-based Unity simulator is a tool made of several collections connected to the FCM Engine and FCM Generator algorithms in which allows the user to interact with the system verbally. The simulator is available to the instructor's interface to execute raw FCM-Gen based simulations.

The subcomponents for Knowledge Engineer access c to and use of CMDST include:
(1) Upload resources c1. The 'Upload Resources' interface presents to the knowledge engineer the ability to upload new videos for use in Flash-based vignettes and scenarios.
(2) Create flash-based vignettes c2. The 'Create Flash-based Vignettes' knowledge engineer interface presents to the knowledge engineer the ability to create Flash-based vignettes and store them in the database.
(3) Import cognitive maps c3. The 'Import Cognitive Maps' knowledge engineer interface presents the knowledge engineer the ability to import cognitive map information stored in XML files.
(4) Manage resources c4. The 'Manage Resources' interface presents to the knowledge engineer the ability to update and remove existing video files, cognitive maps, vignettes, and scenarios.
(5) Simulation maps c5. The 'Simulation Maps' interface presents to the knowledge engineer a list of maps (stored in the database as image files and map information). The knowledge engineer can use this interface to add new maps to the database, remove existing maps from the database, and edit existing map information.
(6) Create Unity-based vignettes c6. The 'Create Unity-based Vignettes' interface presents to the knowledge engineer the ability to create Unity-based vignettes and store them in the database.
(7) Visual statistical feedback of simulation usage c7. The 'Visual Statistics Feedback of Simulation Usage' interface presents to the knowledge engineer a variety of statistical information regarding student and instructor execution of vignettes and scenarios.
(8) Track of recently executed simulations c8. The 'Recently Executed Sims Tracking' knowledge engineer interface presents to the knowledge engineer a list of the most recently executed vignettes and scenarios.
(9) MD-vignette creator c9. The 'Multi-Decision Vignette Creator' knowledge engineer interface provides to the knowledge engineer the ability to create multi-decision vignettes and store them in the database for instructor and student access.
(10) FCM-editor c10. The 'FCM Editor' interface provides to the knowledge engineer the ability to adjust node and edge values in existing cognitive maps stored in the database.
(11) Manage simulations c11. The 'Manage Sims' interface provides to the knowledge engineer the ability to view detailed explanations of individual vignettes and scenarios and to execute individual vignettes and scenarios.
(12) Create Flash-based scenarios c12. The 'Create Flash-Based Scenarios' interface provides to the knowledge engineer the ability to create Flash-based scenarios that can then be stored in the database for student and instructor use.
(13) Manage CoAs c13. The 'Manage COAs' interface provides to the knowledge engineer the ability to edit and remove existing courses of action associated with individual vignettes.
(14) Manage account c14. The 'Manage Account' interface provides to the knowledge engineer the ability to edit information associated with the knowledge engineer's CMDST account, including e-mail address and password.

(15) Unity-based simulations control c15. The 'Unity Weather Controls' interface provides to the knowledge engineer the ability to alter weather and wind conditions in Unity-based vignettes.

(16) Create Unity-based scenarios c16. The 'Create Unity-Based Scenarios' interface provides to the knowledge engineer the ability to create Unity-based scenarios that can then be stored in the database for student and instructor use.

(17) Unity resources c17. The 'Unity Resources Management' interface provides to the knowledge engineer the ability to upload, delete, and modify Unity resources used to build the Unity-based vignettes and scenarios.

(18) Unity scene library c18. The 'Unity Scene Library' is a collection of Unity scenes that are used by Unity-based vignettes and scenarios.

(19) Tutorial c19. Knowledge engineer Tutorials can be used to teach knowledge engineers how to use the several tools available to them through CMDST.

The Knowledge Elicitation Tool 2 is used by the knowledge Engineer (KE) to input information recorded during elicitation sessions with a tactical subject matter expert (SME). From these sessions with tactical SME the KE develops tactical vignettes, scenarios, and their associated tactical FCM. There are four subcomponents to KnowET.

(a) Web interface a. The 'Web Interface' is the subcomponent of KnowET that the user, a knowledge engineer, interacts with directly. The web interface provides the knowledge engineer a series of drag-and-drop-based tools for creating fuzzy cognitive maps. These tools allow the user to add and remove nodes and edges from a fuzzy cognitive map and to adjust node values and edge weights. The web interface also provides the user the ability to save new fuzzy cognitive maps and edits to existing fuzzy cognitive maps to the database through the 'CML File Exporter' subcomponent.

(b) Database b. The database is where fuzzy cognitive maps created by knowledge engineers through the web interface are stored.

(c) Client-side and Server-side Scripts c. The client-side and server-side scripts in the context of KnowET are responsible for establishing and maintaining communication between the web interface on the client's machine (where the knowledge engineer is using the web interface to build fuzzy cognitive maps) and the CMDST server (where fuzzy cognitive maps are stored). These scripts encompass the procedures involved in storing fuzzy cognitive maps in the database, and can also enable an 'autosave' feature which saves the user's current work at regular intervals to ensure minimal loss of data should the knowledge engineer be prematurely disconnected while creating a fuzzy cognitive map.

(d) CML File Exporter d. The 'CML File Exporter' subcomponent is responsible for translating the existing fuzzy cognitive map data from the web interface into a CML data file that can then be sent to the CMDST server and stored in the database (via client-side and server-side scripts). The CML File Exporter ensures that all FCMs created using the web interface are stored in a consistent format.

The CXL output from KnowET is an input to the FCM engine.

The FCM engine 3 consists of four subcomponents: (a) CML a. 'CML' is an XML-based language used to represent the content and structure of fuzzy cognitive maps.

(a) CML Parser b. The 'CML Parser' subcomponent of the FCM engine is responsible for parsing and translating input in the form of CML data into digital fuzzy cognitive maps.

(b) FCM Calculator c. The 'FCM calculator' subcomponent of the FCM engine is responsible for computing the final node values (including the SER (Successful Event Resolution) Node value of digital fuzzy cognitive maps.

(c) FCM XML Generator d. The 'CML generator' subcomponent of the FCM engine is responsible for serializing digital fuzzy cognitive maps into CML data and providing that data as output.

Input is provided to the FCM Engine in the form of a CML data file. CML stands for 'Cognitive map Markup Language'; it is an XML-based data serialization format used to pass fuzzy cognitive map data between components of CMDST.

An input CML file represents a fuzzy cognitive map in its initial state (the 'SER' node value is yet to be calculated). This CML file is passed to the CML Parser a where it is parsed into a digital fuzzy cognitive map that consists of a list of nodes, a list of edges, and a squash function. This digital FCM is then passed to the FCM Calculator b to determine the final value of the 'SER' node.

The FCM Calculator handles all of the math and logic behind computing the nodal values in fuzzy cognitive maps provided to it as input. Traditional fuzzy cognitive maps have a cyclic structure, which can result in one of three end states for nodal values:

Convergence—All nodal values converge to consistent values after a certain number of iterations.

Pattern—All Nodal values begin to cycle through repeating values after a certain number of iterations.

Chaos—Nodal values never reach convergence or begin to cycle in a pattern; they produce new values following each simulation, regardless of the number of iterations that occur.

Because of the acyclic nature of the fuzzy cognitive maps used by CMDST, nodal values are guaranteed to converge. In fact, they are guaranteed to converge after a number of iterations defined by the length of the longest path from any Policy Node to the 'SER' node. The FCM Calculator b utilizes this heuristic when determining final nodal values by first determining the longest path of the FCM and then iterating that many times.

The mathematics employed by the FCM Calculator b to determine final nodal values is the same as that used to compute nodal values in traditional fuzzy cognitive maps. The net activation value of each node is calculated by compiling a list of cause nodes that affect the current node, and summing each cause node's squashed output multiplied by the edge weight connecting it to the current node. The function demonstrating this procedure is shown below:

$$\text{Net activation} = \Sigma_i^{n=0} C_i * E_i$$

where n represents the number of cause nodes that affect the current node, C represents the cause node's squashed output, and E represents the weight of the edge connecting the cause node to the current node.

This net activation is then "squashed" to a value within the range [0, 1]. CMDST supports multiple squash functions and the ability add and edit new squash functions, but the system, by default, uses the sigmoid function, defined as:

$$\text{Squashed Output} = \frac{1}{1 + e^{gain*R}}$$

where R represents the net activation of the current node, and 'gain' is a constant value that determines how quickly the output reaches 0 or 1. The default 'gain' value of the sigmoid function used by CMD-ST is 5.

When the FCM Calculator has finished performing this routine, all nodal values (including that of the SER node) are at their final, convergent state values. The fully computed fuzzy cognitive map is then passed to the CML Generator c as input. The CML Generator constructs a CML data file that represents the fuzzy cognitive map with the final nodal values. This CML file will look almost identical to the CML file passed initially to the CML Parser, except that the values for most Nodes will have changed. This CML file can then be passed as output to any other component of CMDST.

The FCM engine 3 receives input from KnowET 2 and exchanges input and output with FCM Generator 6, CMTrainer 4 via the CMTrainer interface, the MySQL data base 5, and directly with both the Flash Simulator 4(a) and Unity simulator 4(b) within the CM Trainer 4.

The CMTrainer 4 has seven subcomponents:
  (a) Flash Simulator a. This is a standalone Flash based framework that retrieves its resources from the server by paths defined in the database. The framework is given a vignette or scenario defined in an XML format that maps out all the resources needed to execute the simulation.
  (b) Simulation Initiator b. Simulation Initiator is an algorithm that sets up the environment for a simulation to run based on user's environment while taking in consideration the bandwidth speed, system stress level, screen resolution and other factors.
  (c) Unity simulator c. The Unity Simulator is a standalone Unity-based framework that retrieves simulation scenes and resources from the server according to the parameters defined in the vignette. It contains algorithms that adapts to the user's environment in order to simulate the vignette or scenario continuously and efficiently.
  (d) Cognitive Map (CM)-Animator d. CM Animator is a Flash standalone tool that takes CML files as input and displays the cognitive map in an animation presentation.
  (e) Flash vignette scenario Assets e. Flash assets including multimedia resources that are retrieved by the Flash Simulator during execution.
  (f) Unity vignette scenario Assets f. Unity assets including unity scenes, audio files, video files, and 3D models that are retrieved by the Unity Simulator during execution.
  (g) Unity GUI g. Unity Graphical User Interface contains a set of textboxes, texts, buttons, and a layout that make up a user friendly interface for efficient interaction with Unity Simulator.

The Data Base 5 is the fifth major component of the CMDST and receives input from the FCM engine 3 and CMTrainer 4. It also receives direct input from the Flash simulator 4a and the Unity simulator 4b within CMTrainer 4. The Data Base 5 has 11 subcomponents which include:
  (a) Resources a. The 'Resources' tables store all resources associated with Flash-based vignettes and scenarios.
  (b) Army Documents b. The 'Army Documents' tables store a great deal of information taken from Army Field and Technical Manuals, Pamphlets, Regulations, and Circulars.
  (c) Vignettes and Scenarios c. The 'Vignettes/Scenarios' tables store all non-resource information regarding vignettes and scenarios.
  (d) KE Sessions d. The 'KE Sessions' tables store all information obtained through knowledge elicitation sessions.
  (e) User Tables e. The 'User Information' tables store all information regarding user accounts and user settings.
  (f) Student activities f. The 'Student Activities' tables store all information regarding student use of the CMDST system, such as log in and log out times and time spent using specific web interfaces.
  (g) Individual performance analysis g. The 'Performance Analysis' tables store all information regarding students' performance analysis submissions, after action review submissions, and personal development plan submissions
  (h) Analytics h. The 'Analytics' tables store information used to track and calculate significant statistical data concerning things such as student performance and average student completion times of a specific vignette.
  (i) Assignment log i. The 'Assignment Log' tables store all information regarding completed student assignments.
  (j) Unity resources j. The 'Unity Resources' tables store all resources used in Unity-based vignettes and scenarios.
  (k) Unity scenes library k. The 'Unity Scenes' tables store all Unity scenes from which Unity-based vignettes and scenarios are constructed.
  (l) SME combat stories l. These are short video recordings that summarize actual events from which vignettes and scenario events have been developed. They are told by the SME who experienced the event.

The FCM Generator 6 is another component of the CMDST system. The FCM generator 6 receives the leader's decision in the form of a verbal command or set of directions, tasks, or requirements they expect their units to accomplish and converts this command to a natural language text format which is converted to a digitized format, and using key words from a U.S. Army communications protocol library identifies key words and phrases that characterize the decision. This information is compared to information previously identified by the FCM developer's SME as critical to the decision. This is done to isolate the factor that makes up the decision policy node and any independent policy nodes such as weather or terrain. This information is then added to existing pre-event information as well as information identified by the SME to create the learners decision FCM. This is a capability that currently does not exist but one which enables realistic learning in a virtual environment. The FCM generator interfaces directly with the FCM Engine 3 and CMTrainer 4. Seven subcomponents make up the FCM Generator 6, as follows:
  a. Fuzzy Cognitive Map Voice Recognition Engine (FCM-VR Engine) a. The client simulator records the student's verbal commands into a sound file and feeds it into the FCM-VR Engine. The FCM-VR Engine runs a COTS speech recognizer on the sound file, and it transcribes the speech into text based on defined speech grammars. The transcribed text is then analyzed where each word is tagged by the analyzer algorithm to match a defined protocol.

(1) Grammars: If the domain is known and the verbal commands are expected to be within specific protocols, then a set of grammars is developed and stored in the grammars library. For example, the platoon leader in the army follows specific protocols when communicating with the subordinates. Such communications are usually structured as "call signs+commands+endings". Call signs are the acknowledgement of the receiver (e.g. rap 1), and the endings are usually something like 'over' or 'out'. Commands are usually more complex where a defined grammar is required.

(2) Analyzer: The analyzer tool parses through the transcribed text and tags each word by definitions found in the libraries.

b. Orders Parser b. The tagged text is the input of the Orders Parser. This component parses through the tagged text and converts it into orders. An order follows the protocol defined in the libraries.

c. Orders Executor c. The Executor is a tool that runs inside the simulator on the client side. The Executor translates all the orders or commands received by the Orders Parser module and execute them in the order that they were received. For example if 'Rap1 move to LZ' order is about to execute, the executor creates the necessary set of instructions in the game engine for object 'Rap1' to relocate from its current position to position of 'LZ'. The positions of the objects are previously initiated by the vignette/scenario designer. Each object in the virtual world contains a set of properties and settings that replicate its functions in the real world. Once the execution starts, the virtual world's physics, terrain and collision settings become vital part for the simulation. The objects are then simulated and the consequences are observed.

d. End State Analyzer d.
   (1) During the execution of the simulation, an observer collects data of the movements of each object and its effects to other object or objects. The collected data consists of the initial and end states of each of the objects properties along with the influential object. Each affected object contributes to a critical factor.
   (2) The End State Analyzer is responsible for constructing relationships between objects. Relationships are then converted to edges with values between −1 to 1. The influential degree on any object by its properties values differences is assigned a numeric value between −1 to 1 where a negative value represents a decreasing effect and a positive value an increasing effect.

e. Node Creator e. Objects in the virtual world that play roles in the simulation are considered to be critical. A node is created for each of the objects with its state value as the nodal value. The nodal state value is the initial value specified by the vignette designer.

f. Edge Generator (Edge Gen) f. Once all nodes are created and relationships with degrees of influences are identified, the Edge Generator generates edges and attaches them to corresponding nodes resulting in a cognitive map.

g. Fuzzy Cognitive Map Builder (FCM Builder) g.
   (1) From the predefined critical factors in the virtual world with the critical factors introduced through the libraries due to the student commands and the edges that were generated, a complete raw fuzzy cognitive map is generated.
   (2) The raw fuzzy cognitive map is fed into FCM Engine where a computed FCM is produced.

To use the CMDST system, learners may use a platform that can interface with the World Wide Web. As previously mentioned CMDST is an application capable of running on multiple platforms. Some minor adjustments must be made to the CMDST application to ensure compatibility with these platforms. The example provided is for the Android smart phone.

For Mobile platform users 7 to use the CMDST application, the following 9 programmatic modifications to student access would be required.
   (a) Simulator a. The 'Simulator' subcomponent of the CMDST mobile application executes vignettes and scenarios.
   (b) GUI b. The 'GUI' subcomponent of the CMDST mobile application allows the user to interact with the system using touch-based gestures and commands.
   (c) Authentication c. The 'Authentication' subcomponent of the CMDST mobile application adds a layer of security to interactions between the CMDST mobile application and the CMDST server, with which it communicates, ensuring safe transmittal of sensitive information.
   (d) Local data base d. The 'Local Database subcomponent of the CMDST mobile application interacts with available storage devices on the mobile device, allowing information to be stored locally.
   (e) Home view e. The 'Home View' subcomponent of the CMDST mobile application serves as the 'home page' for the application. All interaction with the mobile application will begin at the 'Home View'.
   (f) Results view f. The 'Results View' subcomponent of the CMDST mobile application presents to the user information regarding a recently completed vignette or scenario.
   (g) Server communications handler g. The 'Server Communications Handler' subcomponent of the CMDST mobile application is responsible for sending data and requests to the CMDST server.
   (h) Client communications handler h. The 'Client Communications Handler' subcomponent of the CMDST mobile application is responsible for receiving incoming data from the CMDST server and making it accessible to other subcomponents.
   (i) Alerts and dialogues i. The 'Alerts and Dialogs' subcomponent of the CMDST provides the user with visual and textual feedback as they interact with the system.

In accordance and with the present disclosure, a component of the CMDST system is the tactical Fuzzy Cognitive Map (FCM). Again, the tactical FCM is purposely differentiated from other types of FCM because it uses a unique model in the construct of a military tactical environment. This model is known in the military by the acronym, METT-TC (Mission, Enemy, Terrain and Weather, Troops Available, Time, and Civil Considerations). To use FCM for decision making in domains other than military tactics first requires the identification of the environmental model appropriate for that domain.

The FCM is comprised of nodes, edges or relationships, an SER score, and administrative information. There are three types of nodes: policy nodes, cause and effect nodes, and the SER node. A diagram of the FCM is at FIG. 10 and the subcomponents are described below. Policy nodes are divided into two types: decision and independent policy nodes.

(a) Decision Policy Node a. The decision policy node is the most important node in the FCM because it is the initiating node and it represents the leader's decision. The decision policy node is assigned the full weight value of 1.0. The decision policy node cannot be affected by another node; it can only affect other nodes.

(b) Independent Policy Node b. Independent policy nodes are extremely important critical decision factors such as: mission, time, terrain, weather, or civil circumstances that in combination with the decision policy node will have a significant impact on the successful resolution of the problem or engagement. The independent policy node does not have to be and is rarely assigned a value of 1.0.

(c) Cause and Effect Node c. Cause and effect nodes can have relationships with all types of nodes; e.g., they either influence other nodes or are influenced by other nodes. The only node they do not influence is a policy node. They can be influenced by all nodes except the SER node. Each cause/effect node is assigned a value commensurate with its overall importance to the resolution of the problem or engagement.

(d) The Successful Event Resolution (SER) Node d. The SER node is s terminal node. Unlike other nodes the only purpose for the SER node is to serve as the terminus for all CDF nodes and the mathematical function involved in the simulation's computation of the SER score for the FCM's course of action/decision. All nodal values are positive initially.

(e) SER Score e. Like the decision policy node, the SER nodes initial value is 1.0. The end state value of the SER node following the simulation is the SER Score, a numerical value between 0 and 1.0 that represents the quality of a course of action/decision associated with resolving a specific tactical problem. Generally, the higher the SER score's value the higher the quality of the course of action/decision. However, the reality of decision making is that a low score may represent the best course of action/decision among several relatively low scoring and poor courses of action options/decisions. Consequently, the SER score should be viewed in two different ways: as a value for comparing courses of action being considered for the same battlefield problem or engagement and a value of absolute quality on a scale of 0 to 1.0. The latter way of looking at a SER score provides a basis for determining the level of quality for the course of action or decision on its own merit. If for example, the SER score is 0.86 for one CoA (course of action) and the value of another CoA for that problem is 0.54, there is discernible difference between the two meaning that decision with a 0.86 SER score is significantly better than the decision with a 0.54 score. If the other SER score had be 0.81, there would be little appreciable difference between the two decisions. If in the previous example, the SER score had been 0.61 rather than 0.86, it still would have been better than the 0.54 score but not significantly better. As quality scores are concerned, any SER score between 0.7 and 1.0 is a good score and any SER score between 0 and 0.3 is a poor quality score. SER scores between 0.31 and 0.69 have a moderate quality value.

(f) Edges or Relationships f. The edge or relationship between one node and another is represented by excitatory (positive) or inhibitory (negative) linguistic values which are converted to numerical values when running the simulation to determine a SER score. The table below shows the conversion values from linguistic to numeric.

| Positive | | Negative | |
| --- | --- | --- | --- |
| Linguistic | Numeric | Linguistic | Numeric |
| Slightly Increases | +.25 | Slightly Decreases | −.25 |
| Increases | +.50 | Decreases | −.50 |
| Strongly Increases | +.75 | Strongly Decreases | −.75 |
| Very Strongly Increases | +1.0 | Very Strongly Decreases | −1.0 |

The FCM provides both visual depiction of the critical decision factors involved in any tactical decision as well as a computational tool for calculating a representative quality value for each possible course of action for resolving a problem on the tactical battlefield.

The FCM at FIG. 10 reflects an infantry platoon leader's decision made when the lead vehicle was hit by an improvised explosive device (IED) which initiated an enemy far ambush. The enemy was estimated to be a force of 10 to 16 men armed with light machineguns, automatic rifles, and rocket propelled grenades. The platoon leader made an immediate decision to dismount the mine-resistant, ambush protected (MRAP) vehicles the platoon was in and assault dismounted into the enemy positions. Once dismounted, the infantrymen would have direct fire support from the 50 caliber machineguns mounted on the top of each MRAP. The FCM at FIG. 10 represents the immediate action drill to assault the enemy dismounted.

The visual use of the FCM is important because it provides the students with the ability to see the critical decision factors (CDF) which are displayed as nodes on the FCM, their relative importance to one another by virtue of the numerical value assigned to each node, their relative relationships to one another as depicted by the edges (arrows) that connect the various CDF, the positive or negative strength of that relationship as shown by linguistic values associated with each edge, and the overall quality value of that specific course of action as reflected in the Successful Event Resolution (SER) Score that is found in the SER node.

The quality score found in the SER node is the end result of the simulation calculation performed by the CMDST system using the tactical FCM framework. The SER score provides computational value to the tactical FCM. The SER score is, therefore, an objective basis for comparing various courses of action and their relative merit as a solution to a particular tactical problem or engagement with the enemy. The SER score is not a probability of success score; it simply is a value used to attribute relative quality to possible solutions for tactical problems.

The present disclosure contemplates the development of FCM for each possible course of action for the early vignettes used to establish an analytical foundation for the students. The vignettes created to build intuitive decision making competencies in the students require FCM that reflect the SME course of action only. The FCM generator is use to create the FCM to reflect the students course of action and decision. In either case a process and rules are followed to standardize tactical FCM development. The following section describes that process and the associated rules.

1. Identify the Tactical Problem.

Description. This is not the Mission. This is an event that occurs during the execution of a mission that must be resolved before continuing with the mission. The tactical problem should be viewed as an event which is an obstacle to mission accomplishment. The problem may occur as part of mission execution or outside the scope of mission execution. It occurs on the tactical battlefield and may or may not involve direct contact with an enemy force. The Problem occurs within the context of a tactical environment and a solution to this problem must be decided upon by the leader. The problem and its solution occur within the framework of METT-TC, the Army's environmental model.

Rules. A Tactical Problem must exhibit established parameters in order to qualify as a problem. These parameters are considered rules for problem identification. The following questions should be asked in making this determination.
- (1) Problem Determination. Does the event require a decision or can the event be ignored and the mission still accomplished?
- (a) If the problem does not require a decision, then it can be ignored.
- (b) If the problem cannot be ignored, requires a decision, and the leader has the authority and resources to resolve the problem, they must take action and make a decision.
- (c) If the problem cannot be ignored and the leader does not have the resources or authority to make a decision, then they must seek a decision from higher authority.
- (d) If the problem cannot be ignored and the leader does not have the resources to resolve the problem they must seek resources from higher authority.
- (e) If the problem cannot be ignored and the leader has neither the resources nor authority to resolve the problem but they determine that to ignore the problem would cause serious and adverse secondary or tertiary effects, then they must take action and make a decision.
- (2) Time and Sense of Urgency. The extent to which the tactical leader can analyze possible courses of action in resolving a problem is almost always limited by time. Therefore, the urgency associated with the situation surrounding most tactical problems will usually constrain a leader's ability to make a detailed analysis of any CoA.
- (3) Rapid Problem Assessment. Consequently, the leader must be able to quickly evaluate the nature and scope of the problem, how it impacts their mission, and how quickly a decision must be made.
- (4) Situational Awareness and Understanding. All problems must be resolved within the context of the tactical environment. The tactical environment is comprised of the six components of METT-TC. During a military operation the state of each of these factors is constantly changing. The "Situation" or context is dynamic. Every step forward changes the situation; every second that goes by means a change in the situation/context. Leaders must always be aware of the changing context that would impact decisions they may have to make that are mere seconds or meters away. By mentally keeping up with the changing tactical situation/context leaders are better able to rapidly assimilate the present situation and context and match it to the problem at had to arrive at a timely and quality solution (CoA) or decision.
- (5) Time and CoA Analysis. If time permits, the leader should perform a quick mental review of the various options (Courses of Action) available to them and the merits of each. These are always evaluated against the backdrop of their unit's assigned mission, commander's intent, and the concept of operations. While this particular step is not germane to building an FCM it is important to understand that the decision making training using FCM is designed to build a library of virtual tactical decision experiences in all types of tactical environmental factors, conditions, situation, and mission tasks to enable the leader to become a competent intuitive decision maker who, over time, relies less and less on deliberate, analytical reasoning to make sound and timely tactical decisions.

2. Review the Situation.

Description. This is a quick review of the key situational elements. For new leaders this is a thoughtful and somewhat analytic process; for experienced leaders it is more experiential and intuitive. The following is a list of situational elements that should be considered as they may relate to a specific problem. Again, time is the most critical element of all because it dictates the level of analytical detail the leader can afford. These elements include in order of priority.
- (1) Time. Available time prior to making a decision is a direct function of the sense of urgency surrounding a specific problem. The more time that is available, the more analytic the problem analysis can be.
- (2) Mission. Next to time, mission is always the most critical facet of the situation surrounding the problem. It is the reason the leader and their unit are on an operation. It should be the one thing uppermost in the mind of the leader. Why is their unit on this operation and how is this tactical problem impacting mission accomplishment? The earlier mission analysis performed by the leader should have identified the specified, implied, and required tasks that form the mission statement. Each of these must be considered in a review of the mission statement.
- (3) Commander's Intent. Next to time and mission, commander's intent is always an important consideration for the leader to consider. What's important to their commander should be important to the leader. The commander's intent focuses on what that the commander wants done or does not want done. For the leader to, in any way, violate the commander's intent, they must have a very good reason.
- (4) Concept of the Operation and Subunit Tasks. The execution portion of every OPORD contains how the mission is to be accomplished. This also includes any specific subunit tasks or coordinating instructions which are often used to define the missions of subordinate units.
- (5) Enemy Capabilities and Intentions. Knowing and understanding the enemy's capabilities and intentions is rarely given the attention it deserves. The fundamental question that always needs to be addressed when confronted with a tactical problem is how could the enemy leverage the present tactical problem with which I am now confronted and how likely is it that they will? It is dangerous to either over or under-estimate the capabilities and intentions of the enemy. A leader's ability to accurately judge the enemy comes from studying their previous operational tendencies. The more a leader studies this in advance, the better prepared they are to accurately adjudge the enemy's capabilities and intention in any specific situation.
- (6) Friendly Capabilities, Strengths, and Weaknesses. This is a quick review of the following:
- (a) Type of unit and combat power.
- (b) Personnel Strength.
- (c) Leader experience and training
- (d) Time in country and combat.
- (e) Unit morale.

Rules. The Rules in making a situational review are time and, to some extent, enemy driven.

(1) Immediate Action (IA) Required.

(a) When is IA Required? These events are always characterized by contact with the enemy or a situation in which the soldiers in a leader's unit are immediately under the threat of being killed or seriously wounded. In circumstances in which men are about to be killed or seriously wounded the leader does not have time for analysis.

(b) Leader Initial Reaction. The leader must react immediately based on their current situational awareness and mental preparedness for any contingency. The leader's response must be to initiate an immediate action drill and/or seek cover. In such situations, the leader determines that they have seconds to react. In reality, the decision is an immediate response that may or may not be accompanied by a verbal command or signal.

(c) Following the Initial Response. Once the initial response is taken the leader follows with direction and guidance to their subordinates. If they have sufficient information to make an immediate decision they issue commands to them in a FRAGO (fragmentary order) format. If they need more information to make a decision they either move to a position that will provide that information or orders one or more of their subordinates or attached units to take specific actions to develop or determine the information needed. If they feel they have a good understanding of what is happening they then issue an order to their subordinates that will begin to resolve the problem; if they do not have a good understanding of what is happening, they must take action to further develop the situation and gain the information needed. The means by which the leader chooses to gain the information needed is a decision unto itself with multiple factors involved: time, risk, information required, current locations of subordinate leaders, likely enemy actions, location and actions of adjacent units, the status of friendly wounded, location and risk to noncombatants, etc.

(d) Time Severely Limited. The reality is that time is a luxury the leader does not have in these situations and they simply must make the best decision they can and given the paucity of information available to them.

(2) Non-Contact Decisions. Non-contact decisions on the tactical battlefield are those in which problems occur when the leader's force is not in immediate or eminent contact with the enemy. During such events, the time available for analysis is greater than in contact events but it is always limited. The time available for analysis is driven by: mission, the probability of enemy contact, and the estimated time to resolve the problem.

During these non-contact events, the desirability of the various Courses of Action will be determined to a large extent by the Time estimated to it will take to resolve the problem.

(3) Problem Resolution Requiring Multiple Decisions. In those instances in which multiple and sometimes parallel decisions are required to resolve a problem or an engagement, a new FCM is required to support the new decision. For those CDF cause and effect nodes that were used in the first decision and remain CDF in the second decision, their initial value is the output value of the same node and FCM used for Decision One at the conclusion of the decision one simulation. If a cause and effect node used in Decision One no longer applies to Decision Two it is not repeated in the Decision Two FCM. However, if a new CDF cause and effect node is added to Decision Two that was not a CDF in Decision One the value of that CDF cause and effect node is determined by its importance in resolving the current (Decision Two) problem. The Decision Two decision policy node is a completely new decision. Therefore, the value of the decision node for Decision Two will be one (1.0), the initial value of all decision nodes before the execution of the simulation. The value of the SER Node for the Decision Two FCM prior to the simulation execution is also one (1.0). Only the cause and effect nodes in Decision Two (if applied in Decision One) take on the end-state value they had following the simulation for Decision One.

3. Identify Possible Courses of Action (CoA)

Description. Courses of Action are possible options that the leaders may choose as a solution to the battlefield problem with which they are confronted. Once they have selected a course of action, the leader has in effect made their decision how they plan on resolving the problem at hand. A course of action is based upon using some or all of the forces available to the leader to resolve the problem. It is the allocation and application of these forces that forms the basis of the course of action.

Rules. Rules that apply in stating a course of action follow.

(1) State the Course of Action that First Comes to Mind. This is the first step in becoming an intuitive decision maker. The process used by a novice leader in arriving at the first course of action is actually an intuitive one, albeit lacking in a substantial and diverse library of experiences to draw from. While the lack of tactical experience supports making poor decisions initially, the process is borne of intuitive reasoning not analytical thinking All CoA include the following elements:

(a) Fires. There are two types of fires-direct and indirect. The CoA should include who is responsible for the fires, what is the objective or target for the fires, what is the purpose of the fires-suppression, destruction, blocking, etc., when will they be initiated and lifted/or shifted, and what is the command or signal to lift or shift fires.

(b) Maneuver. In terms of movement on the battlefield what is the objective of each maneuver element subordinate to the leader, when will they initiate movement, what direction will they take during movement, what geographic control measures will be used to control their movement, what is the sequence of movement, what form of maneuver is required, and what signals or commands will be used to control movement.

(c) Use of Enablers. All enablers available to the leader should be included. These enablers should include: unattended aerial vehicles (UAV), Engineers, aviation support, close air support, interpreters, dogs and dog handlers, indigenous or supporting national forces, civil affairs forces, psychological operations forces, military police, medical units, etc.

(d) Logistics. This would include resupply information, ground transportation, and explosive ordinance disposal support.

(e) Command and control. The leader's location during the resolution of the problem is important as well as any control measures (especially timings) not previously addressed.

(2) Develop Other Possible Courses of Action. [A learning point here is that many execution problems can be avoided if potential problems are anticipated and addressed during the planning phase of the operation.

During the planning phase there is considerably more time to consider and evaluate solutions than there is during execution. For example, the platoon leader assigned convoy escort responsibility should ask the following "what if" questions.
(a) What if a vehicle breaks down? What kind of vehicle?
  Stryker
  Ten-ton Supply Truck
  Up-armored HMMWV
(b) What Options Should I consider?
  Tow with Tow Bar
  Repair on site
  Abandon Vehicle
  Destroy vehicle in place
  Cross load supplies, equipment, and ammunition
  Take a Ten-ton Wrecker
  Take spare vehicle
  Call QRF (Quick Reaction Force) and secure vehicle
(c) Determine Criteria to Use in Identifying Possible CoA
  Accomplishes Mission.
  Solves the Problem
  Easy to Implement
  Saves Time
  Reduces Risk
(d) Determine Resource Availability.
  Ten-ton Wrecker
  Wheeled Vehicle Mechanic
  Spare Parts and Assemblies
  Diagnostic Equipment
  Spare Ten-ton Supply Truck
  Thermite Grenades
  Heavy Duty Forklift
(3) Eliminate Unsupportable CoA. If the leader has done their planning correctly they know precisely which CoA are supportable before the convoy ever departs.
(4) Consider Best Possible CoA. If a vehicle breakdown had been anticipated during planning and the required resources were available the following options should be available and considered by the leader.
(a) Tow the Vehicle. If a supply vehicle breaks down use the Ten-ton Wrecker to tow it.
(b) Repair the vehicle on site using the wrecker and mechanic accompanying the convoy. This assumes the mechanic has all of the needed repair parts, fluids, tools, and possibly diagnostic equipment to repair the vehicle. The biggest issues with this CoA are: the extended time needed for repair, the undesirable field location for the repair, and the extended vulnerability of the convoy during and following the repair.
(c) Reload Supplies, etc to spare vehicle or Cross-Load supplies and equipment among other 5 vehicles; Tow disabled vehicle. This requires MHE and at least 30 to 40 minutes to execute. It also assumes the loads are palletized.
(d) Discard Other Options.
  Destroy vehicle with thermite grenades. Extremely wasteful and unnecessary.
  Abandon Vehicle. Unnecessary and wasteful.
  Call QRF and secure the vehicle until the convoy's return the following day. This is not a desirable CoA because it leaves the vehicle with limited security overnight. Also, it is a poor use of the QRF and limits its availability for higher priority missions.
(e) The action verb is different for each CoA: "Tow", "Repair", and "Recover." The unit owning the "Tow" task is mechanic with the wrecker; The mechanic and the wrecker also own the "Repair" task. The Squad Leader of the disabled vehicle owns the recover task along with the QRF. The actual CoA statement should include 'Who' (the owner of the Task), 'What' (action to take-the task), 'When' (to execute the task), and 'Why' (the purpose to executing the task). These are always elements of a Course of Action and as a rule they are the minimum items that must be included in a CoA statement.

4. Determine Critical Decision Factors for Each CoA.

Description. Critical Decision Factors are those factors drawn from the tactical environmental model of METT-TC that have the greatest importance and influence in evaluating a potential course of action as a solution to a tactical problem or enemy engagement. Ideally, all of the METT-TC environmental elements will be represented by at least one critical decision factor. Critical decision factors will be represented as nodes on the FCM. Generally, the critical decision factors for any CoA's FCM are laid out sequentially from left to right with the policy nodes on the left the effect nodes in the middle and the terminal or SER Node on the right of the FCM.

Rules. The critical decision factors include the Policy Nodes and Effect Nodes. In most cases there will be two Policy Nodes: one Decision Policy Node and one Independent Policy Node. The numbers of Cause/Effect Nodes are strictly determined by the situation surrounding each vignette. Finally, there is only one SER Node which as a terminal node is not a CDF. Rules for each type of node are below.

5. Policy Nodes.

Description. Policy Nodes are the critical decision factors that initiate or support leader decisions. They are the driving factors among all critical decision factors.

Rules.
(1) The Policy Nodes are always found on the extreme left of any FCM.
(2) A Policy Node is by definition an initiating node. The single most important characteristic of a Policy Node is that it is not impacted or affected by another node.

6. Decision Policy Node.

Description. Decision Policy Nodes are the most important critical decision factors because they reflect the leader's decision and drive all other critical decision factors except the Supporting Policy Node.

Rules.
(1) Decision Policy Node. The first Policy Node is the Decision Policy Node. It is almost always a Troops Available Environmental node because friendly troops are usually directed to do something or take action by the leader to resolve the problem at hand.
(2) Name or Title. The name or title of the Decision Policy Node always reflects the CoA it represents; it is normally characterized by an active verb that is descriptive of the action directed by the leader, such as: suppress, secure, move, repair, etc.
(3) Value. The value of the Decision Policy Node is always 1.0 (One) because the leader only considers those CoA that are possible its true value lies not in any intrinsic value it might have but on its relationships with and impact on other nodes. Knowing that it is a viable course of action, however, doesn't determine its potential for success.

7. Independent Policy Node.

Description. The Independent Policy Node can be any of the environmental factors and like the Decision Policy node it is unaffected by other nodes. Although not reflective of the decision around which a CoA is based, the Independent Policy Node does play a significant role in the successful outcome of a problem or enemy engagement.

Rules. The Independent Policy Node:
(1) Appears in all CoA. The independent policy node appears in all other courses of action although not necessarily with the same overall valuation.
(2) Is essential to mission accomplishment or problem resolution or both. For example, time may be an important component of a mission. If so, it may be an Independent Policy Node. The terrain or weather or both could play an important part in determining problem resolution or mission accomplishment, so this environmental factor may be the second policy node. It is not unlikely in a COIN operation that civil considerations (especially ROE) could be the Independent Policy node.
(3) Emphasized in the OPORD or FRAGO. The independent policy node may find emphasis in the commander's intent, concept of the operation, sub-unit tasks, or coordination instructions sections of the OPORD or FRAGO. This added emphasis may warrant selection as an Independent Policy Node.
(4) May Impact Two or More Cause/Effect Nodes. It also must be a tactical environmental factor that impacts more than one cause/effect node within an FCM. In other words, the independent policy node will appear in at least two paths within a course of action.
(5) Consequence of the "Trigger". The independent policy node may also be the result of the "Trigger Event." In the example cited above in which the convoy experiences a disabled vehicle en route to its destination, the result of the disabled vehicle was to bring the convoy to a halt. By definition, a convoy in order to accomplish it mission must move to and arrive at a destination by a specific time. When it is at a halt short of its destination its ability to accomplish its mission is immediately brought into question because it is halted and no longer moving toward its destination. Therefore, the state of being 'halted' means the convoy in jeopardy of mission failure until it begins to move again toward its destination.
(6) Overall Valuation. The value assigned to an independent policy node is determined in the same manner used for a Cause/Effect Policy Node. See Rule 8, below.

8. Cause and Effect Nodes.

Description. Cause and effect nodes are critical decision factors which are impacted by Policy Nodes or other cause and effect nodes. Cause and effect nodes represent all tactical environmental factors. They reflect both cause and effect in that they enjoy relationships with the policy and other cause and effect nodes that impact them. The degree to which they are affected is determined by the overall value of the affecting node (regardless of whether it is a policy node or another cause/effect node) and the connecting edge. Cause/effect nodes are determined by the tactical environment model of METT-TC.

Rules.
(1) There should be a cause/effect Node for each tactical environmental domain; e.g., mission, enemy, terrain and weather, troops available, time, and civil circumstances.
(2) There is no fixed rule as to how many cause/effect nodes there should be. The questions to be asked is: whether or not it is a critical factor that influences the decision.
(3) The value of the cause/effect node is determined by the following: importance of the node to the resolution of the problem. This can be both positive and negative. For example, a cause/effect node for time (accumulated) at the temporary halt when a convoy experiences a vehicle breakdown will have a negative impact on overall available time remaining for the convoy to accomplish it mission; e.g., as the time at the temporary halt increases the time available to accomplish the convoy's mission decreases. Thus, time at the halt is negative. However, the degree to which the convoy remains at the halt depends on the course of action selected by the leader. If a decision is made to tow the vehicle it should take no more than ten minutes for the convoy to get back on the road en route to its destination. Thus, the temporary held only slightly decreased the available time. If, the course of action selected was to repair the vehicle on site then the total time accumulated at the halt might be as much as an hour to two hours this would strongly decrease available time. The key is that in this case the edge relationship between the two nodes is always negative but the degree to which it is negative is determined by the course of action selected.

9. Successful Event Resolution (SER) Node.

Description. The SER Node is a terminal node. It is the last node in the computational flow of the simulation and, therefore, is the culminating value all nodes and relationships reflected in the FCM. This culminating value is termed the SER Score, the comparative value score for each FCM.

Rules. The following rules apply to the SER Node.
(1) There is only one SER Node in an FCM.
(2) The initial value of all SER Nodes is one (1.0).
(3) All paths from the last cause and effect nodes lead to and affect the SER Node.
(4) The FCM simulation computes a SER score based upon the cumulative effects of the relationships of all cause and effect nodes and their relationship values (edges) from the Decision Node to the SER Node.
(5) The SER score is a quality score that is an objective index of the quality of a specific FCM as compared to other FCM representing potential courses of action for a single tactical problem or enemy engagement.

10. Edges

Description. Edges reflect relationships between nodes on an FCM. There are two important aspects of this relationship: one is whether or not the relationship is positive or negative and the other is the strength of that positive or negative relationship. For example, the relationship, if positive, would be an excitatory relationship; if negative, it would be an inhibitory relationship.

Rules.
(1) The node in an FCM which has an impacting or affecting relationship with another node is the causal node; the node in an FCM which is impacted by another node is the effect node.
(2) The edge or relationship is depicted by an arrow on an FCM. The relationship is either positive (excitatory) or negative (decreasing).
(3) Linguistic values are attributed to both the excitatory and decreasing relationships to indicate the relative strengths of the impacting (cause) node on the impacted (effect) node.

(4) There are four excitatory linguistic values and four inhibitory linguistic values that can be selected to represent the strength of the cause and effect relationship.

(5) Each linguistic value has a corresponding numeric value. For the excitatory values they are: slightly increases (0.25), increases (0.50), strongly increases (0.75), and very strongly increases (1.0). For the inhibitory values they are: slightly decreases (0.25), decreases (0.50), strongly decreases (0.75), and very strongly decreases (1.0).

(6) During the simulation calculation the node values are combined with associated relationship values for all connected nodes and the relationship connecting them using a mathematical function from which the SER Score is derived.

11. Paths and Culminating Paths.

Description. A path is the flow of relationships between two or more connected nodes. A culminating path is considered a single, unique, and sequential connecting set of nodes starting with the decision node and terminating with the SER Node. It may contain elements of another culminating path; e.g., a path consisting of two or more nodes and their relationships but the entirety of the culminating path will contain only nodes and relationships unique to it. The culminating path has little significance in the FCM except that is used to determine the number of independent calculations used in parallel to determine the SER score in the SER Node. The longest culminating path in an FCM determines the total number of iterations required in a simulation function for that FCM.

Rules. The following rules apply to the culminating path.
(1) The longest culminating path in an FCM is determined by the culminating path containing the greatest number of nodes.
(2) The total number of culminating paths in an FCM determines the number of simulation iterations need to arrive at an SER Score.

Thus, in accordance with the above, the present disclosure is directed to a self-contained developmental learning system that has many feature functionalities, which are summarized below.

1. Provides virtual experience. A virtual experience has value equivalent to actual experiences. Experiences build expertise. Expertise facilitates the use of intuitive decision making 2. Focuses on evaluating, analyzing, understanding, and developing a leader's decision making competency. CMDST is a total learning tool; it evaluates the quality and timeliness of a decision; it guides students through an analysis of their decisionmaking performance; it builds understanding of the critical factors that must be considered when making a decision; and, it develops a platoon leader's decisionmaking competency to a higher level by evolving their intuitive decision making capability 3. Delivered via the internet. If the leader has access to a wired or wireless network, they can access CMDST.

4. Mounted or Dismounted. CMDST provides mounted and dismounted infantry leader training and rehearsal capability.

5. Leader Development Training at the Institution and Unit. CMDST can be used to satisfy leader decision making training requirements at the institution or unit. This includes active and reserve component units.

6. Continually updates the CMDST system with changes in equipment, doctrine, force structure, lessons learned, and best practices. CMDST can be linked to changes in each of these areas to ensure the vignettes are always current.

7. Provide a crawl, walk, run, apply, rehearse, review, and retrain capability. CMDST applies each of these methods to its training strategy. CMDST uses demonstration, crawl, walk, and run tutorials progression to introduce the student to CMDST and the vignette. A demonstration of the system initiates the students learning by showing them the system in use from beginning to end in order to show the student the power and potential value of the system. The next step is the crawl; it is a system-provided vignette that employs an intelligent tutor to take the student through the use of CMDST on a step-by-step basis to show the student what happens and why during each step; the Walk is a student-led walk through of a vignette (the action is stopped at appropriate learning points) assisted by an intelligent tutor; the Run phase is a student led simulation during which the vignette runs complete at normal speed and through the decision course of action selected by the student. The intelligent tutor assists the student with the self-directed performance analysis, the self-directed AAR, and the student's development of an individual decision making development plan. The Run excursion is graded but not recorded. During Apply, the student's performance is recorded for the first time; they are not assisted during this excursion. The self-directed performance analysis is used to engage the student in assessing every aspect of the student's decision making performance. The self-directed AAR is trained in each phase and used following each vignette. The insights gained from the performance analysis make the AAR all the more meaningful and significant. Retraining is determined by the system based on the student's performance at specified gates in the training. If the student fails to achieve required performance standards at these gates, they are required to retrain using similar but not the same vignettes.

8. Vignettes are used to create tactical experiences. CMDST is a tool to accelerate and enhance experiential learning by doing. Learning results from reflection and analysis. The intent of the student performance analysis is to help the student understand both the positive and negative qualities of their decision and to learn from both.

9. Engaging, Learner-Centric Training and Learning. The entire design of the CMDST vignette is to provide engaging and realistic representations of the tactical battlefield through high-fidelity 3D vignettes and place learning responsibility directly on the student.

10. Full Spectrum Operations. Vignettes used with CMDST represent the gamut of full spectrum operations—from terrorist to counterinsurgency to conventional forces in highly mobile and lethal warfare involving combined arms, joint and multinational forces to warfare involving weapons of mass destruction (CBR) as well as international cyber-warfare. It is at the upper ends of this spectrum which involve CBR and cyber-warfare that the vignettes can play an extremely important role not available in institutional and most operational training due to risk, cost, and impracticality.

11. Adaptability. Again, CMDST vignettes by design develop a student's critical thinking and problem solving skills. They also develop operational adaptability through the application of situational ambiguity, lack of information, the intensity of action and the normal stressors of combat from noise to light.

12. Independent Thinking CMDST reinforces independent thinking by creating situations within the vignettes that require decisiveness and the exercise of moral and ethical judgments under conditions of extreme duress.

13. Mastery of Fundamentals. One of the advantages of CMDST is the ability to build mastery through repetition. This can be achieved in multiple ways: changing conditional elements of the same basic vignette, increasing enablers available to the leader, reducing information available to the leader, or increasing the number and intensity of the stressors introduced during the simulation. This may change the decision options available to the students and present them with a myriad of possible courses of action which, when exercised, builds competency in the basics.

14. Culture and Language. CMDST provides an excellent tool to reinforce culture and language training by employing both in a tactical context.

15. Capitalize on Experience. From its inception, stress has been place on the development of situational vignettes by eliciting information from recently returned leaders from Iraq and Afghanistan. Their knowledge and experience was viewed as vital to building realistic and viable vignettes.

16. Context-based, Collaborative, Problem-Centered Instruction. CMDST clearly meets all of these requirements. All vignettes are tactical, therefore context-based. Collaboration, although not stressed, can be accomplished through the application of peer-directed performance analysis and AAR. Collaborative instruction can also be achieved during CMDST networked training of subordinate leaders. Each vignette represents a problem that must be resolved.

17. Blended Learning. CMDST is a great example of blended learning. The instruction is delivered by technology and it reinforces instruction and field training 18. Adaptive Learning and Use of Intelligent Tutors. Intelligent tutors are used to assist students in learning how to use CMDST initially. Thereafter, the intelligent tutors are used to guide students through the self-directed performance analysis and AAR for each vignette excursion.

19. Assessments. Critical learning components of CMDST are the self-directed performance assessment and AAR. The structure and content of each focus on comprehension and retention. They also engender engagement and discovery, two desirable and important outcomes of the CMDST process.

20. Tracking and Feedback. The CMDST system records and tracks all student performance through an analytics program. It can analyze student performance over time, against other students in their platoon or company, against all previous students, against students from their commissioning source, and of course, against system established standards. Performance can also be analyzed by vignette mission and by various conditions. Performance feedback is provided to students at specified gates and on-call. Performance data is provided automatically to instructors when gates are achieved or on-call. Feedback is provided in regard to: Vignette SER scores, Decision Response Times, Total Vignettes Completed by type and by condition, and Level of Performance Achieved. Trend Analysis is also provided in regard to SER score and decision responsiveness.

21. Self-Structured Learning. The entire design and purpose for CMDST was designed to make it a self-structured learning experience with little to no instructor intervention with the exception of the intelligent Tutor.

22. Peer-Based Learning. Collaborative learning can also be achieved through the Peer-directed Performance Analysis and AAR. This is an option available to trainers (at the institution) and commanders (at the unit). The advantage of this method is that it involves a second person in the analysis/review process. It provides increased objectivity and a more thorough approach than does a self-directed approach.

23. Soldier Created Content. As noted previously, CMDST vignette development first starts with knowledge elicitation involving recently returned leaders from Afghanistan and Iraq. This is the best kind of soldier created content.

24. Virtual Training Environments. CMDST is a virtual training system. The visuals are virtual and the characters are virtual. But the situations and conditions are very real.

25. Short, Hard-Hitting Vignettes. The vignettes to include the situation background and the play through of the student's decision normally are complete in times that vary from 10-15 minutes. The performance analysis and AAR normally take an additional 15 minutes to complete.

26. The Simulation Can Be Delivered To and Exercised On Multiple Platforms. CMDST can be delivered to all types of PCs, notebook computers, smart phones. It may also be developed for use with PlayStation 3, X-Box, and Wii. The CMDST may be delivered via a Web server, although it may be installed in personal devices and used without requiring Internet connectivity. The simulations are designed to be used on multiple platforms to include: smart phones, such as the iPhone, Android, and Blackberry; tablets such as the iPad; notebook computers; laptop and desktop personal computers using OSX or Windows operating systems. It also is designed to be used with game systems such as: PlayStation 3, X-Box, and Wii. CMDST is, therefore, a highly flexible and versatile simulation system.

Below is a synopsis of the CMDST learning objectives associated with the use of CMDST.

Terminal Learning Objective.

Enable student leaders to make better and timely tactical decisions.

1. Enabling Learning Objective. Recognize and understand the critical decision factors that must be considered in any course of action evaluation related to a tactical battlefield event.
2. Enabling Learning Objective. At the initiation of any battlefield event quickly determine from the critical battlefield decision factors identified which one is the most critical and most influential in determining resolution success.
3. Enabling Learning Objective. Recognize and understand when a tactical battlefield decision is urgent and potentially life threatening.
4. Enabling Learning Objective. Understand and recognize the factors that constitute situational awareness and translate that awareness to the sense making of situational understanding by taking proactive measures to minimize the adverse consequences of enemy actions and be able to leverage that understanding in seizing and maintaining the initiative.

Terminal Learning Objective.

Enhance the ability of student leaders to effectively assess, review, and develop plans to improve their own decision making performance.

1. Enabling Learning Objective. The student will perform a comprehensive self-directed analysis of their decision making performance for each vignette simulation.
2. Enabling Learning Objective. Perform a self-directed after action review (AAR) based on insights gained from their self-directed analysis of their decision making performance using a modified form of the U.S. Army AAR.
3. Enabling Learning Objective. Develop an individual leader decision making action plan using the U.S. Army Leader Development Guide format.
4. Enabling Learning Objective. Through rigorous self-assessment and reflection the student will apply the lessons learned from their virtual decision making successes and failures to improve their future decision making performance.
5. Enabling Learning Objective. The student will be able to understand and develop plans to leverage their virtual decision making experiences by developing new approaches to be tried and evaluated in future virtual decision making experiences.

Terminal Learning Objective. Enable student leaders to effectively employ all tactical systems available to them, to make culturally sensitive and ethical decisions, and to modify the conditional difficulty in the execution of missions and while resolving tactical problems or engagements.
1. Enabling Learning Objective. The student will demonstrate the ability to integrate cultural awareness requirements into established vignettes.
2. Enabling Learning Objective. The student will demonstrate the ability to effective employ a multitude of enablers that would be available to them on the tactical battlefield.
3. Enabling Learning Objective. The student will demonstrate proficiency in introducing increasing conditional difficulty into CMDST system vignettes and scenarios.

Terminal Learning Objective. The student leader will demonstrate the ability to use and apply the CMDST system in a training and operational environment.
1. Enabling Learning Objective. The student will be able to use and navigate within the CMDST system website.
2. Enabling Learning Objective. The student will be able to develop CMDST system learning goals and objectives and select vignette and scenario training strategies based on individual performance level and unit considerations.
3. Enabling Learning Objective. The student will demonstrate knowledge and proficiency in all CMDST system student tasks by successfully completing the post test in all web tool bar categories.
4. Enabling Learning Objective. The student will know how to set up and use the CMDST system in a linked network environment to train subordinate leaders.
5. Enabling Learning Objective. The student will know when and how to use the CMDST system for self-learning, peer-assisted learning, or collaborative group learning.
6. Enabling Learning Objective. The student will coach other students in the demo-crawl-walk-run-run for record-remediate-and retrain steps of training with the CMDST system.
7. Enabling Learning Objective. The student will be know how to use the CMDST system to support operational planning, leader rehearsals, and post mission AAR/debriefings when deployed to an operational theater.
8. Enabling Learning Objective. The student will be able to use the intelligent tutor in maximizing the value of the CMDST system.
9. Enabling Learning Objective. The student will be able to use the CMDST system's analytic suite to evaluate individual performance.

The invention claimed is:

1. A method for cognitive map-based decision simulation for training (CMDST) used in developing the decision making competency, the CMDST using cognitive map-based decision simulation and trainer and domain-specific fuzzy cognitive maps (FCMs) to perform a method, comprising:
simulating the resolution of domain-related problems and emergency situations, the simulating using critical decision factors and their relationships;
performing comparative analyses and calculate comparative values for different decisions selected to resolve the same domain-related problem;
visually aiding in the conduct of performance analyses and after action reviews (AAR) following the simulation of various courses of action and their related domain-specific decisions to the same domain-related problem; and
automatically generating the domain-specific FCM from verbal commands of a user.

2. The method of claim 1, wherein the simulating the resolution comprises critical decision factors and their causal relationships that are derived from a domain-specific environment model.

3. The method of claim 1, wherein Domain-specific FCMs are designed and developed in accordance with the framework of a domain-accepted environmental model.

4. The method of claim 1, wherein the simulating comprises the resolution of virtual domain-related problems or emergency situations.

5. The method of claim 1, wherein the CMDST system is used to simulate decision outcomes to tactical problems or engagements by employing vignettes or scenarios.

6. The method of claim 5, further comprising providing a user interface and a database of vignette or scenario models.

7. The method of claim 1, further comprising:
providing a representation of the critical decision factors involved in a user's decision and the relationship of those decision factors to one another;
calculating a value score for that can be used in comparing the user's decisions against that of a subject matter expert (SME).

8. A method for cognitive map-based decision simulation for training (CMDST) used in developing the decision making competency, the CMDST using cognitive map-based decision simulation and trainer and domain-specific fuzzy cognitive maps (FCMs) to perform a method, comprising:
simulating the resolution of domain-related problems and emergency situations, the simulating using critical decision factors and their relationships;
performing comparative analyses and calculate comparative values for different decisions selected to resolve the same domain-related problem;
visually aiding in the conduct of performance analyses and after action reviews (AAR) following the simulation of various courses of action and their related domain-specific decisions to the same domain-related problem;
providing a representation of the critical decision factors involved in a user's decision and the relationship of those decision factors to one another; and
calculating a value score for that can be used in comparing the user's decisions against that of a subject matter expert (SME).

9. The method of claim 8, wherein the simulating the resolution comprises critical decision factors and their causal relationships that are derived from a domain-specific environment model.

10. The method of claim 8, wherein Domain-specific FCMs are designed and developed in accordance with the framework of a domain-accepted environmental model.

11. The method of claim 8, wherein the simulating comprises the resolution of virtual domain-related problems or emergency situations.

12. The method of claim 8, wherein the CMDST system is used to simulate decision outcomes to tactical problems or engagements by employing vignettes or scenarios.

13. The method of claim 12, further comprising providing a user interface and a database of vignette or scenario models.

14. The method of claim 8, further comprising automatically generating the domain-specific FCM from verbal commands of a user.

\* \* \* \* \*